US010793654B2

(12) United States Patent
Wagner et al.

(10) Patent No.: US 10,793,654 B2
(45) Date of Patent: Oct. 6, 2020

(54) ZIEGLER-NATTA CATALYST COMPOSITIONS FOR PRODUCING POLYETHYLENES WITH A HIGH MOLECULAR WEIGHT TAIL AND METHODS OF MAKING THE SAME

(71) Applicant: Union Carbide Corporation, Seadrift, TX (US)

(72) Inventors: Burkhard E. Wagner, Highland Park, NJ (US); Robert C. Job, Katy, TX (US); Ann M. Schoeb-Wolters, Lebanon, NJ (US); Robert J. Jorgensen, Fort Bragg, CA (US)

(73) Assignee: Union Carbide Corporation, Seadrift, TX (US)

( * ) Notice: Subject to any disclaimer, the term of this patent is extended or adjusted under 35 U.S.C. 154(b) by 101 days.

(21) Appl. No.: 16/050,517

(22) Filed: Jul. 31, 2018

(65) Prior Publication Data

US 2018/0334518 A1 Nov. 22, 2018

Related U.S. Application Data

(60) Continuation of application No. 14/657,841, filed on Mar. 13, 2015, now Pat. No. 10,513,571, which is a (Continued)

(51) Int. Cl.
*C08F 210/16* (2006.01)
*C08F 10/00* (2006.01)
(Continued)

(52) U.S. Cl.
CPC ......... *C08F 210/16* (2013.01); *C08F 4/6548* (2013.01); *C08F 4/6567* (2013.01); *C08F 10/00* (2013.01); *C08F 2410/03* (2013.01)

(58) Field of Classification Search
CPC ...... C08F 10/02; C08F 4/6548; C08F 4/6567; C08F 210/16; C08F 10/00; C08F 2410/03
See application file for complete search history.

(56) References Cited

U.S. PATENT DOCUMENTS 3,644,318 A  2/1972  Diedrich et al.
4,293,673 A  10/1981  Hamer et al.
(Continued)

FOREIGN PATENT DOCUMENTS

EP  0449355 A2  10/1991
EP  0855409 A1  7/1998
(Continued)

OTHER PUBLICATIONS

PCT/US09/053008 Intl Search Report and Written Opinion dated Feb. 6, 2011.
(Continued)

*Primary Examiner* — Jun Li

(57) ABSTRACT

Methods of preparing a polymerization catalyst component is provided, in which a magnesium component, a Lewis acid solubilizing component, a titanium compound, optionally a transition metal compound different than the titanium compound, and typically an inert filler are combined in a slurrying agent and spray-dried to produce a catalyst precursor in the form of a substantially spherical and porous solid particle. The methods and catalysts of this disclosure can provide ethylene homopolymer and copolymer resins having a high molecular weight tail and a broadened molecular weight distribution as compared to more traditional Ziegler-Natta catalysts.

9 Claims, 3 Drawing Sheets

Related U.S. Application Data division of application No. 13/054,965, filed as application No. PCT/US2009/053008 on Aug. 6, 2009, now abandoned.

(60) Provisional application No. 61/086,595, filed on Aug. 6, 2008.

(51) Int. Cl.
*C08F 4/654* (2006.01)
*C08F 4/656* (2006.01)

(56) References Cited

U.S. PATENT DOCUMENTS

| | | | |
|---|---|---|---|
| 4,302,565 A | 11/1981 | Goeke et al. | |
| 4,322,027 A | 3/1982 | Reba | |
| 4,379,759 A | 4/1983 | Goeke et al. | |
| 4,413,110 A | 11/1983 | Kavesh et al. | |
| 4,663,220 A | 5/1987 | Wisneski et al. | |
| 4,668,566 A | 5/1987 | Braun | |
| 5,034,361 A | 7/1991 | Job et al. | |
| 5,124,298 A | 6/1992 | Job | |
| 5,405,901 A | 4/1995 | Daniell et al. | |
| 5,514,634 A | 5/1996 | Hagerty et al. | |
| 5,550,094 A | 8/1996 | Ali et al. | |
| 5,567,665 A | 10/1996 | Wagner et al. | |
| 5,589,539 A | 12/1996 | Wagner et al. | |
| 5,604,172 A | 2/1997 | Wagner et al. | |
| 5,652,314 A | 7/1997 | Wagner et al. | |
| 5,672,669 A | 9/1997 | Wasserman et al. | |
| 6,187,866 B1 | 2/2001 | Jorgensen et al. | |
| 6,248,831 B1 | 6/2001 | Maheshwari et al. | |
| 6,441,309 B1 | 8/2002 | Jow et al. | |
| 6,511,935 B2 | 1/2003 | Job | |
| 6,759,362 B2 | 7/2004 | Job | |
| 6,806,221 B2 | 10/2004 | Wagner et al. | |
| 6,982,237 B2 | 1/2006 | Wagner et al. | |
| 7,160,833 B2 | 1/2007 | Wagner et al. | |
| 7,348,383 B2 | 3/2008 | Zoeckler et al. | |
| 2005/0054519 A1* | 3/2005 | Kao | C08F 10/00 502/103 |
| 2006/0166812 A1* | 7/2006 | Braganca | C08F 10/02 502/103 |
| 2007/0213482 A1* | 9/2007 | Xiao | C08F 4/651 526/124.3 |
| 2008/0058198 A1* | 3/2008 | Xu | C08F 10/00 502/103 |
| 2008/0207972 A1* | 8/2008 | Uhrhammer | C08F 10/00 585/524 |
| 2011/0130271 A1 | 6/2011 | Wagner et al. | |

FOREIGN PATENT DOCUMENTS

| | | |
|---|---|---|
| EP | 0721128 B1 | 7/2001 |
| WO | 1994/015977 A1 | 7/1994 |
| WO | 2001/000685 A2 | 1/2001 |
| WO | 2001/005845 A1 | 1/2001 |
| WO | 2007/147714 A1 | 12/2007 |
| WO | 2010/017393 A1 | 2/2010 |

OTHER PUBLICATIONS

PCT/US09/053008 Intl Preliminary Report on Patentability dated Feb. 8, 2011.

* cited by examiner

Left Scale: ✕ ——— 1st Reactor Cumulative Wt % > than
Right Scale: ▦ ——— 2nd Reactor Cumulative Wt % > than

ZIEGLER-NATTA CATALYST COMPOSITIONS FOR PRODUCING POLYETHYLENES WITH A HIGH MOLECULAR WEIGHT TAIL AND METHODS OF MAKING THE SAME

CROSS-REFERENCE TO RELATED APPLICATIONS

This application claims benefit of U.S. patent application Ser. No. 14/657,841 filed Mar. 13, 2015; which issued as U.S. Pat. No. 10,513,571 B2 on Dec. 24, 2019 and is a divisional application of U.S. patent application Ser. No. 13/054,965 filed Jan. 20, 2011, now abandoned; which is a 371 International application of PCT/US2009/053008 filed Aug. 6, 2009, now expired; which claims benefit of U.S. provisional patent application No. 61/086,595 filed Aug. 6, 2008. The entire contents of which are hereby incorporated herein by reference.

FIELD OF THE INVENTION

This disclosure relates to Ziegler-Natta catalyst precursors and compositions, processes for their manufacture, and the production of polyolefins using Ziegler-Natta catalyst compositions.

BACKGROUND OF THE INVENTION

The properties of polymers depend upon the properties of the catalyst used in their preparation. Therefore, a catalysts' composition, activation conditions, size, size distribution, shape, and the like, all factor into the characteristics of the final product and help ensure a good commercial workability of the catalyst, especially in gas phase and slurry polymerizations. For example, in order to produce olefin copolymers of about 500 µm in size, a catalyst particle size of about 15 µm to about 50 µm is generally preferred for the polymerization. Other physical properties such as a well-developed system of pores throughout the catalyst structure and good mechanical properties that resist wear during the polymerization process can be advantageous, with the latter helping ensure a good bulk density of the resulting polymer. Chemical features such as the ratio of polymerization-active metal(s) to co-catalyst or activator can affect active site structure, which in turn can impart a variety of properties to the polymer.

One aspect in developing polymerization catalysts is the search for new catalysts and methods for their production that allow a measure of control and adjustment of the composition, structure, size, and size distribution of the catalyst particles. One simple technique for preparing and shaping polymerization catalysts is spray-drying, a process in which liquid droplets containing dissolved or suspended materials, or both, are ejected from a flywheel or a nozzle, and the solid catalyst particles are formed as the dissolution or suspension solvent evaporates. The properties of spray-dried solid catalyst particles often may be adjusted by altering the make-up of the precursor solution or suspension, the spray-drying parameters, and the subsequent processing steps.

Another aspect in developing polymerization catalysts is the search for new catalysts and methods for their production that afford flexibility over the composition and structure of the catalyst and that of the resulting polymer.

BRIEF SUMMARY OF THE INVENTION

In developing polymerization catalysts, generally there is a need to develop new polymerization catalysts and methods to prepare and activate the catalysts, with a view to afford flexibility over the composition and structure of the catalyst and that of the resulting polymer. This disclosure provides for catalyst precursors, catalysts, and methods for preparing the catalyst precursors and catalysts, in which the particle components are combined in any desired combination and amount in a slurry, with or without a filler, and then spray-dried to afford a catalyst precursor incorporating the component materials in any desired ratio. For example, a magnesium dihydrocarbyl oxide can be co-sprayed with a titanium alkoxide component in any molar ratio, with or without a filler, to generate a particulate catalyst precursor with any desired Mg:Ti molar ratio. Thus, the method of this disclosure does not rely on employing discrete compounds with well-defined atomic ratios of components, but rather affords flexibility to tailor the catalyst according to the desired properties of the desired polyolefin.

In one aspect, this disclosure describes catalyst precursors, catalysts, and methods that can be used to make PE resins such as LLPDE or HDPE of varying molecular weight distributions and which are useful for the manufacture of articles such as monofilament or stretch tape. Typically, the polyethylenes produced according to this disclosure are characterized by a portion of the resin having a high molecular weight such that the molecular weight distribution of the PE resin features up to about 10% of a high molecular weight tail. As disclosed, the catalyst precursor particles of this disclosure are prepared by spray-drying the precursor components from a non-aqueous slurry in any combination and concentration desired. These particles then can be optionally treated with additional components such transition metals components, then halogenated, and activated to form the active catalyst.

Spray-drying the catalyst precursor components can be conducted using non-aqueous slurries which also can include any fillers or additives that are desired. Typically, Mg/Ti catalysts providing a high molecular weight tail have been produced using precipitation techniques, which generally limits the ratio of Ti to Mg in the catalyst to the stoichiometry of the precipitated compound, thereby restricting the properties of the resin that is produced from the catalyst. The spray-drying process of this disclosure lends itself to combining the catalyst precursor components in the slurry and in the resulting particle in any concentration and in any ratio that is desired, thereby affording flexibility for tailoring the catalyst and the resin properties as needed.

In another aspect, the catalyst precursor particles comprise a magnesium dihydrocarbyl oxide, and the spray-dried catalyst precursor can be halogenated under mild conditions prior to co-catalyst activation, which affords a catalyst for preparing PE resins featuring the high molecular weight tail. While not intended to be bound by theory, it is thought that the conditions of halogenation of the precursor can affect the molecular weight distribution of the resin and the formation of the high molecular weight tail.

Thus, spray-drying the catalyst precursor components from a slurry also provides a way of forming catalyst precursor particles that have not only the desired composition and concentrations of metals and additives, but also provides the desired particle size, size distribution, shape, and porosity. As compared to the precipitation process, the spray-drying method is relatively inexpensive, readily scaled up, and quite flexible in the types of materials that can be produced.

Numerous Ziegler-Natta catalyst systems and supports have been described, examples of which are disclosed in U.S. Pat. No. 5,124,298 (Job); U.S. Pat. No. 6,248,831

(Maheshwari, et al.); U.S. Pat. No. 5,604,172 (Wagner, et al.); U.S. Pat. No. 5,034,361 (Job, et al.); U.S. Pat. No. 5,550,094 (Ali, et al.); U.S. Pat. No. 5,514,634 (Hagerty, et al.); U.S. Pat. No. 6,187,866 (Jorgensen, et al.); U.S. Pat. No. 6,441,309 (Jow, et al.); and U.S. Pat. No. 7,348,383 (Zoeckler, et al.); and in EP 0855401 (Sherry, et al.), each of which is hereby incorporated by reference in its entirety.

DETAILED DESCRIPTION OF THE INVENTION

Figure 1:
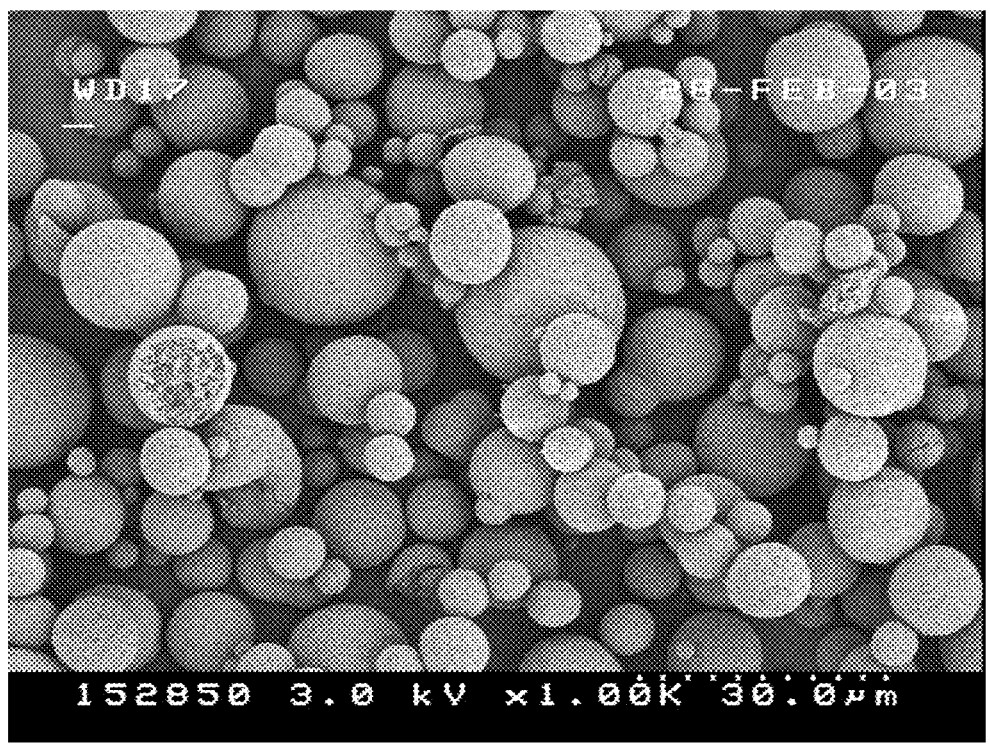
FIG. 1 is a scanning electron microscopic (SEM) image of a spray-dried Mg/Ti catalyst precursor prior to chlorination, which illustrates the substantially spherical morphology of the particles obtained according to this disclosure. As illustrated at the bottom right of the image, the distance between the first and last dot is 30.0 μm.

The disclosed method provides for the production of particulate catalyst supports and catalyst precursors that are useful for polymerizing olefins, including olefins in which the controllable incorporation of a high molecular tail is desired. Due to the non-aqueous nature of the spray-drying process employed in the disclosed method, hydrolytically-unstable compositions can be readily prepared. Catalyst precursors of defined composition with controlled metal concentrations and controlled ratios of two or more metals can be prepared in substantially spherical form, typically as porous particles, usually from about 10 microns to about 100 microns in size. Moreover, the metal-containing components of the catalyst precursor particles can exist in non-solid form such as an oil within the solid, porous matrix.

Catalyst precursors also can be prepared in substantially spherical form according to this disclosure, typically as porous particles from about 10 microns to about 100 microns in size. Microparticulate solid materials such as fillers, reagents, and additives ranging in size from nano-sized to about 25% the size of the final particle itself can be incorporated uniformly within the catalyst precursor or support particle simply by their addition to the slurry to be spray-dried.

Specifically, in one aspect the present disclosure provides for new Ziegler-Natta catalyst precursors, catalysts, and supports; methods of manufacturing the Ziegler-Natta precursors, catalysts, and supports, and methods of polymerizing α-olefins using the catalysts. Polyethylene (PE) resins containing from about 1% to about 10% by weight of a high molecular weight (MW) tail (typically, $M_W$ of at least about 1,000,000) are useful for a variety of applications where increased melt strength and greater stiffness of the resin is required. While not intending to be bound by theory, it appears that the small percentage of high molecular weight long chains that exist in such resins can in certain cases serve a function similar to that served by long-chain branching in other PE resins. One aspect of this disclosure provides that these resins can be produced using Mg/Ti Ziegler-Natta (Z/N) catalysts containing at least two types of active sites. Again, while not intending to be theory-bound, the minor portion of active sites is thought to be responsible for the high MW tail, while the major portion of active sites is thought to produce the standard Z/N resin having a lower MW.

Previous Mg/Ti Ziegler-Natta (Z/N) catalyst precursors of this type typically were made using precipitation methods, which produced catalyst precursors of rather well-defined stoichiometries that were isolated on the basis of precipitation kinetics, and hence exhibited somewhat inflexible Mg/Ti ratios. As a result, precipitation methods generally do not allow the flexibility to achieve lower Ti loadings or to vary Mg/Ti ratios, the particle form (shape, size, size distribution, porosity) is not readily adjusted, and it is generally difficult to incorporate fillers or additives into the solid state structure.

One aspect of this disclosure provides for methods of controlling catalyst precursor composition and precursor morphology (size and shape), and a catalyst precursor itself that allows some control over the high molecular weight tail and catalyst polymerization kinetics. In this aspect, this control can be attained by adjusting the Ti loading and the Ti/Mg ratio in the catalyst precursor to better fit the requirements of gas phase or slurry processes, which is made possible by the methods of this disclosure.

In one aspect of this disclosure, there is provided a method of preparing a catalyst component, the method comprising:
  a) contacting in a slurrying agent:
    i) at least one magnesium dihydrocarbyl oxide;
    ii) at least one Lewis acidic solubilizing agent;
    iii) at least one titanium compound;
    iv) optionally, at least one transition metal compound different from the titanium compound, where the transition metal is selected from the Groups 4-6 metals; and
    v) optionally, at least one filler; and
  b) spray-drying the slurry of step a) to evaporate the slurrying agent and to produce solid particles;
  where the magnesium dihydrocarbyl oxide, the titanium compound, and the optional transition metal compound are present in the slurry in any molar ratio.

This disclosure also provides that the method of preparing a catalyst component may further comprise a subsequent halogenation procedure, step c), in which the solid particles of step b) are contacted with at least one halogenating agent under conditions that partially halogenate the catalyst precursor. The halogenation procedure is not limited to a particular reagent or restricted as to the manner in which it is carried out, but includes any halogenation procedure using any agent(s) that results in partial rather than exhaustive halogenation of the catalyst precursor. In one aspect, halogenation can be chlorination. For example, the halogenation may constitute a single-stage halogenation step in which the solid particles of step b) are contacted with a chlorination agent such as an alkyl aluminum chloride, that is, a chlorine-containing aluminum alkyl. Alternatively, the halogenation step may constitute a subsequent, multi-stage halogenation step in which the solid particles of step b) immediately supra are contacted with at least one relatively mild first halogenating agent and at least one stronger second halogenating agent in succession. These single-stage and multi-stage halogenations are provided by way of example and are not intended to be limiting, because the halogenation includes any halogenation procedure that results in partial rather than exhaustive halogenation of the catalyst precursor.

A further aspect of this disclosure provides that the transition metal compound different from the titanium compound can be a zirconium or a hafnium compound.

In one aspect, the components of the slurry to be spray-dried need not have undergone any chemical reactions with each other before or during the spray-drying step, as long as the resulting spray-dried particle is solid enough to retain, support, or hold the non-solid components within the solid matrix. Thus, the spray-drying method allows for the use of some catalyst precursor components that can be in the form of viscous liquids or oils. Alternatively, solidification in the form of co-mingled agglomerates or glasses also may occur to provide particles where most or all the components exist in a solid state. In one aspect, the slurry to be spray-dried can include Mg and a Ti component; however, the addition of a transition metal compound different from the titanium compound such as V, Zr, or Hf into the spray-drying slurry affords multi-metallic Ziegler catalysts, leading to even broader molecular weight distribution in the produced resins.

In accordance with this disclosure, the catalyst component can comprise a spray-dried contact product or mixture of:
a) at least one magnesium dihydrocarbyl oxide;
b) at least one Lewis acidic solubilizing agent;
c) at least one titanium compound;
d) optionally, at least one transition metal compound different from the titanium compound, where the transition metal is selected from the Groups 4-6 metals; and
e) optionally, at least one filler.

In another aspect, this disclosure provides a catalyst component that can comprise the contact product of:
a) a spray-dried contact product or mixture of:
i) at least one magnesium dihydrocarbyl oxide;
ii) at least one Lewis acidic solubilizing agent;
iii) at least one titanium compound;
iv) optionally, at least one transition metal compound different from the titanium compound, where the transition metal is selected from the Groups 4-6 metals; and
v) optionally, at least one filler;
and
b) at least one halogenating agent.

In this aspect, the at least one halogenating agent typically includes a chlorination agent such as an alkyl aluminum chloride. Analogous boron chloride agents can also be used. Suitable alkyl aluminum chlorides include any mixed-ligand alkyl aluminum chloride, such as an alkyl aluminum dichloride ($RAlCl_2$), a dialkyl aluminum chloride ($R_2AlCl$), or an alkyl aluminum sesquichloride ($R_3Al_2Cl_3$). The alkyl group of any of these alkyl aluminum chloride compounds typically has from 1 to 12 carbon atoms and can be a linear or branched alkyl. Thus, examples of suitable alkyl aluminum chlorides include, but are not limited to, $MeAlCl_2$, $Me_2AlCl$, $EtAlCl_2$, $Et_2AlCl$, n-$PrAlCl_2$, n-$Pr_2AlCl$, i-$PrAlCl_2$, i-$Pr_2AlCl$, n-$BuAlCl_2$, n-$Bu_2AlCl$, i-$BuAlCl_2$, i-$Bu_2AlCl$, $Me_3Al_2Cl_3$, $Et_3Al_2Cl_3$, n-$Pr_3Al_2Cl_3$, i-$Pr_3Al_2Cl_3$, n-$Bu_3Al_2Cl_3$, i-$Pr_3Al_2Cl_3$, and the like.

In a further aspect, the contacting of the spray-dried contact product or mixture with the at least one halogenating agent can be carried out under conditions that partially halogenate the catalyst precursor, for example, by limiting the stoichiometry of the halogenating agent relative to the magnesium, titanium, and optional other transition metal, by controlling the temperature under which the halogenation process is conducted, by selecting the halogenating agent according to its relatively propensity to undergo ligand exchange with the particular spray-dried contact product or mixture that is subjected to halogenation, or by any combination thereof. By way of example, when an alkyl aluminum chloride such as $EtAlCl_2$ or an equimolar mixture of $EtAlCl_2$ or $Et_2AlCl$ (ethylaluminum sesquichloride or EASC) is employed, the spray-dried product may be contacted with an amount of halogenating agent to provide about 2 moles of total chloride content per mole of total oxygen-bound and nitrogen-bound ligands in the combined magnesium, titanium, and optional other transition metal components. Thus, if the spray-dried product contains 1 molar equivalent of $Ti(OEt)_4$ and 2 molar equivalents $Mg(OEt)_2$, approximately 10.7 molar equivalent (typically about 9.7-11.7 mol) of ethylaluminum sesquichloride (calculated as $Et_{1.5}AlCl_{1.5}$), or approximately 8 molar equivalent (typically about 7-9 mol) of $EtAlCl_2$ are contacted with the spray-dried product.

In one aspect, the contact step of the spray-dried contact product or mixture with the at least one halogenating agent can occur at temperatures of about 70° C. or less using the indicate amounts of alkyl aluminum chlorides in order to partially halogenate the catalyst precursor. In another aspect, to achieve partial halogenation, the solid catalyst precursor particles may be contacted with the halogenating agent(s) at a temperature, for example, less than or equal to about 90° C., less than or equal to about 80° C., less than or equal to about 70° C., less than or equal to about 60° C., or less than or equal to about 50° C. A practical minimum temperature at which this halogenation is observed to occur is about 35° C., therefore in this aspect, to achieve partial halogenation, the solid catalyst precursor particles may be contacted with the halogenating agent(s) at a temperature, from about 35° C. to about 90° C., from about 35° C. to about 80° C., from about 35° C. to about 70° C., from about 35° C. to about 60° C., or from about 35° C. to about 50° C. Halogenation is typically carried out from about 35° C. to about 70° C.

Evidence of partial halogenation of the catalyst precursor is obtained by examining the properties of the polymer obtained when the precursor is activated and used to polymerize olefins. For example, partial halogenation provides a catalyst that produces a relatively broad molecular weight distribution with a high molecular weight tail as disclosed herein, as compared to the more narrow molecular weight distribution polymer produced from an exhaustively halogenated catalyst.

In the present disclosure, halogenation includes chlorination, bromination, or iodination; therefore, the general reference in this disclosure to chlorination of a precursor should be considered exemplary of halogenation, with the understanding that this disclosure is by way of example. Generally, chlorination of a spray-dried precursor can be effected by either a single stage or two-stage process. In a single stage process, a chlorination agent such as an alkyl aluminum chloride, is contacted with the spray-dried precursor particles under conditions that lead to partial rather than exhaustive halogenation. Halogenation of a spray-dried precursor also may be effected by a multi-stage process, for example, a two-stage process. Again using chlorination as the exemplary halogenation process, one example of a two-stage chlorination process is the chlorination of the precursor with a relatively mild reagent such as $SiCl_4$, followed by chlorination with $RAlCl_2$ or a similar relatively stronger chlorination agent, under conditions that result in partial halogenation. Regardless of how the halogenation agents are being employed, the halogenation step is carried out under stoichiometry, reagent selection, and temperature conditions that partially halogenate the catalyst precursor.

Among other things, catalyst precursors that are halogenated or chlorinated under "mild conditions" provide polymers with a broader molecular weight distribution (MWD), and typically with a high molecular weight tail, as compared with catalyst precursors that are halogenated or chlorinated under more "forcing conditions." For example, polyethylene (PE) resins containing from about 1% to about 3% by weight of a high molecular weight (MW) tail (typically, MW about 1,000,000) are useful for a variety of applications where increased melt strength and greater stiffness of the resin is required. Moreover, the weight percentage of the resin in a high molecular weight (MW) tail can be tailored or adjusted along a continuum of values, based upon the degree of halogenation of the solid catalyst precursor particles. Thus, PE resins containing from about 0.2%, about 0.5%, about 1%, about 1.5%, about 2%, about 3%, about 4%, about 5%, about 6%, about 7%, about 8%, about 9%, or about 10% by weight of a high MW tail having a Mw of about 1,000,000 or greater can be attained as a function of the extent or degree of halogenation of the catalyst precursor. Moreover, this high MW tail can be obtained from the catalysts of this disclosure even when the catalyst contains a titanium compound as the only transition metal component, and does not contain a Group 4-6 transition metal compound different from the titanium compound. While not theory-bound, it is thought that the extent of chlorination as determined by conditions such as the chlorination reaction temperature and time, and the potency of the chlorination agent, all help determine the number and proportion of active sites that give the high molecular weight tail. For example, the use of stronger chlorinating agents and harsher chlorinating conditions convert the majority of sites to a highly active polymerization catalyst that gives the narrow molecular weight distribution that is typical of resins from standard Ziegler catalysts.

Additional aspects provided by the present disclosure include at least the following. First, the disclosed method demonstrates a process by which liquid or oily components can be incorporated in a particulate catalyst precursor by a spray-drying method, and these components used in the active catalyst derived therefrom. The method and catalysts of this disclosure demonstrate that catalysts can be prepared and used successfully that do not require a specific ratio of active metal (such as Ti, Hf, or their combination) to Mg, and in fact, the present catalysts can be used over a wide range of molar ratios of metals and metal concentrations as deemed optimal for the specific polymerization conditions being employed. Previous precipitated catalysts for making PE resins with a high MW tail typically required specific Mg/Ti formulations that were prepared by the controlled precipitation of the precursor material, unlike the present invention. The flexibility afforded by the method and catalysts of this disclosure allow tailoring of the polymerization reaction to minimize or preclude excessive or inadequate reaction rates.

In a further aspect, the spray-drying method also affords cohesive, fines-free resins that can be produced due to the cohesive nature of the starting particles. For example, FIG. 1 provides a scanning electron microscopic (SEM) image of a spray-dried Mg/Ti catalyst precursor prepared according to this disclosure, which illustrates the substantially spherical morphology of the particles obtained by this method.

Process for Preparing the Catalyst Component or Precursor

The Magnesium Dihydrocarbyl Oxide. The dihydrocarbyl oxide magnesium compound employed in the preparation of the catalyst components generally can be represented by the formula Mg(OR')(OR"), in which each of R' and R" are selected independently from an alkyl or an aryl group having up to 10 carbon atoms, which can be the same or different. Generally, the dihydrocarbyl oxide magnesium compound employed can be a magnesium dialkoxide or a magnesium diaryloxide, although magnesium compounds containing one alkoxide and one aryloxide group are also useful. The typical alkoxide group(s) of dihydrocarbyl oxide magnesium compound, when present, is selected from an alkoxide having from 1 to 8 carbon atoms, and usually from 2 to 6 carbon atoms. The typical aryloxide group(s), when present, usually contains from 6 to 10 carbon atoms. In a further aspect, the magnesium dihydrocarbyl oxide compounds that are suitable for this invention include compounds having the formula $Mg(OR^1)_2$, where $R^1$ in each occurrence, is selected independently from an alkyl having from 1 to 8 carbon atoms, or, alternatively, from 1 to 6 carbon atoms.

Examples of magnesium dialkoxides and magnesium diaryloxides that can be employed include, but are not limited to, magnesium diethoxide, magnesium diisopropoxide, magnesium di-n-butoxide, ethoxy magnesium isobutoxide, magnesium diphenoxide, and magnesium dinaphthoxide. Magnesium diethoxide is commonly used. Examples of the magnesium compounds containing one alkoxide and one aryloxide group which can be employed include, but are not limited to, ethoxy magnesium phenoxide and naphthoxy magnesium isoamyloxide.

Magnesium dialkoxides and diaryloxides are commercially available and can be used as-is in the preparation of the catalyst precursors or supports in this disclosure. Alternatively, the magnesium dihydrocarbyl oxides can be prepared in-situ using magnesium metal and an alcohol as reactant and source of the magnesium hydrocarbyl oxide (typically, alkoxide) group. Thus, the alcohol is selected to provide the desired hydrocarbyl oxide group of the magnesium compound.

To solubilize or partially solubilize the dihydrocarbyl oxide magnesium compound in the slurrying agent, the magnesium compound is contacted with a solublizing agent such as a Lewis acidic solublizing agent like carbon dioxide. In this aspect, the term "slurrying agent" is used in this disclosure regardless of the solubility of the dihydrocarbyl oxide magnesium compound in that particular agent, whether soluble, partially soluble, or insoluble. For example, carboxylation of the dihydrocarbyl oxide magnesium compound is effected by suspending the dihydrocarbyl oxide magnesium compound and optionally the filler in a suitable slurrying agent and contacting the slurry with carbon dioxide, though the order of addition is not critical. The slurrying agent is usually selected as one capable of at least partially dissolving the carboxylated dihydrocarbyl oxide magnesium compound produced by contacting the dihydrocarbyl oxide magnesium compound with the solublizing agent. When carbon dioxide is the solublizing agent, reaction between the dihydrocarbyl oxide magnesium compound and $CO_2$ produces a magnesium hydrocarbyl carbonate, which is usually more soluble in the slurrying agent than its precursor. A monohydric (monoprotic) alcohol such as ethanol or a multihydric (multiprotic) alcohol such as ethylene glycol can be employed as a slurrying agent, but any combination thereof is also suitable. In one aspect, the Lewis acidic solubilizing agent can be selected from carbon dioxide, sulfur dioxide, formaldehyde, $Al(OR^2)_3$, $B(OR^2)_3$, or any combination thereof, in which $R^2$ in each occurrence is selected independently from an alkyl having up to 6 carbon atoms inclusive. In another aspect, Al(OEt)$_3$, B(OEt)$_3$, or a combination thereof are useful Lewis acidic solubilizing agents.

If an alcohol is used as the slurrying agent, such alcohol typically contains from 1 to 4 carbon atoms. In this regard, the alcohol typically contains from 1 to 3 carbon atoms. Thus, suitable alcohols include methanol, ethanol, n-propanol, and isopropanol. When an alcohol is the slurrying agent, it is not necessary to limit the alcohol to one having the same hydrocarbyloxy (alkoxide) group as that of the magnesium compound. Rather, the transesterification reaction that occurs upon slurrying a magnesium hydrocarbyl oxide such as Mg(OEt)$_2$ in the presence of a Lewis acid solubilizing agent in an alcohol HOR of a higher hydrocarbyl group may be useful in providing the desired higher magnesium dihydrocarbyl oxide, Mg(OR)$_2$. However, an alcohol having a hydrocarbyloxy group which is the same as the hydrocarbyloxy groups of the magnesium compound also can be used. For example, the magnesium compound can be magnesium diethoxide and the alcohol is ethanol.

One aspect of this disclosure provides for carboxylation of the dihydrocarbyl oxide magnesium compound by simply bubbling gaseous carbon dioxide through the slurry of the dihydrocarbyl oxide magnesium compound and optionally the filler in an alcohol or other polar slurrying agent. Alternatively, dry ice may be added to the slurry as the source of the carbon dioxide. Whatever the source of the carbon dioxide, it should be anhydrous or dried in order to decrease hydrolysis of the dihydrocarbyl oxide magnesium compound. Continuous stirring of the slurry while the carbon dioxide is added is helpful in order to bring the carbon dioxide and the dihydrocarbyl oxide magnesium compound into contact and to prevent the dihydrocarbyl oxide magnesium compound from settling out of the slurry.

Since the reaction between the carbon dioxide and the dihydrocarbyl oxide magnesium compound is exothermic, the temperature of the mixture begins to rise as the carbon dioxide is added to the slurry. As the slurry warms and the reaction progresses, a turbid, viscous solution usually results. If desired, addition of the carbon dioxide can be continued until the reaction has proceeded to completion as indicated by the ending of the exotherm. In any event, reaction usually should be allowed to continue until a magnesium hydrocarbyl carbonate containing from 0.5 moles to 2.0 moles of carbon dioxide per gram atom of magnesium is produced. The magnesium hydrocarbyl carbonate produced in this manner can be represented by the general formula Mg(OR')(OR")•xCO$_2$, in which each of R' and R" are selected independently from alkyl or aryl groups having up to 10 carbon atoms, and can be the same or different, and x has a value of from about 0.5 to about 2.0. While not intending to be bound by theory, it is thought that this material is made up of a mixture of two, and possibly more, components. These two components are thought to include carboxylated compounds such as magnesium hydrocarbyl carbonates in which the CO$_2$ moiety has inserted into one (mono-carboxylated component) or both (dicarboxylated component) Mg—O bonds of the magnesium dihydrocarbyl oxide. In this aspect, there is typically no additional decarboxylation step necessary in the preparation of the solid particulate particles provided in this disclosure.

In still another aspect, by using a dihydrocarbyl oxide magnesium compound in the slurry for spray-drying the catalyst composition, the HCl or any acid released upon contact of the titanium or other transition metal halides with alcohol slurrying agent, may react or may be taken up by the dihydrocarbyl oxide magnesium compound or magnesium alkyl carbonate when using CO$_2$ as the Lewis acid solubilizing agent. In this latter case, mixed magnesium hydrocarbyl carbonate chloride salts are formed upon reaction with HCl. As a result, the slurry does not become acidic, in contrast to the case when using magnesium chloride as disclosed in U.S. Pat. No. 7,348,383 (Zoeckler, et al.).

In another aspect, the use of the magnesium hydrocarbyl carbonate also may avoid the disadvantage inherent in spray-drying of magnesium chloride solutions. Thus, the glassy magnesium hydrocarbyl carbonate substrate does not form an oil near 100° C., such at that formed by the magnesium chloride analog, as illustrated in the Examples of Table 5. In these examples using magnesium hydrocarbyl carbonate, higher concentrations of magnesium can be spray-dried without clogging of the spray-drier and without the resultant low yields of spray-dried material.

In a further aspect, it has been observed the magnesium hydrocarbyl carbonate precursors do not provide precursor particles that form hard, rigid shells during particle drying. As a result, large "egg-shell" particles and shattered shell fragments generally can be avoided, in contrast to the precursor particles that form using magnesium chloride.

In yet a further aspect, the methods and compositions of this disclosure provide that other metal compounds that are liquid by nature can be incorporated at relatively high weight ratios into the glass-like matrix of the magnesium hydrocarbyl carbonate, without an extensive or any chemical reaction taking place. This feature provides the flexibility to tailor the catalyst precursor according to any molar ratio of components desired, regardless of the solid or liquid nature of the component.

The Filler. The spray-dried catalyst precursor or catalyst support of this disclosure can contain an inert filler which can help control the shape of the resulting particles by providing bulk to the solid composition. The optional filler can be added or mixed into the slurrying agent before the spray-drying step. Typically, at least one filler material is employed, but it is possible to prepare particulate catalyst precursors without adding a filler material.

Suitable fillers are inert to reaction with the other components of the catalyst composition, and to the other active components of the reaction system. Any solid particulate composition that is inert to reaction with the other catalyst system components and does not deleteriously affect the polymerization can be employed. Such compounds can be organic or inorganic and include, but are not limited to, silicas including fumed silica, titanium dioxide, zinc oxide, magnesium carbonate, magnesium oxide, carbon, calcium carbonate, or any combination thereof. In some aspects, the filler can be fumed hydrophobic silica that imparts relatively high viscosity to the slurry and good strength to the spray-dried particles. In other embodiments, two or more fillers may be used.

In one aspect, the filler can be any solid, non-porous, particulate material, provided that it is inert to the dihydrocarbyl oxide magnesium, the hydrocarbyl carbonate, and the slurrying agent, and remains inert during subsequent stages of catalyst preparation and use. In one aspect, the spray-dried particles are decarboxylated after their formation, and any filler is selected to withstand the heating or other conditions necessary for decarboxylation, halogenation, contact with co-catalyst, and subsequent polymerization, and any other steps used for preparing and using the solid catalyst.

Examples of suitable fillers include, but are not limited to, silicas, such as fumed silica, titanium dioxide, zinc oxide, magnesium carbonate, magnesium oxide, carbon, calcium carbonate, and any combination thereof. Fumed hydrophobic silica is typically employed, because it imparts high viscosity to the slurry and does not react chemically with the other components in the catalyst system. For example, Cab-O-Sil® TS-610 (Cabot Corporation) is a typical fumed silica that can be used. In this aspect, low porosity silicas such as fumed silicas are especially useful, though suitable silicas are not limited thereto.

This disclosure provides that the particles of filler material are significantly smaller than the size of the desired particle to be spray-dried. For example, the filler material particle size can be up to about 25% of the diameter of the spray-dried particle. In another aspect, the filler material particle size can be up to about 20%, up to about 15%, or up to about 10% of the diameter of the spray-dried particle. Even with larger-sized filler particles, there is typically more than one filler particle per spray-dried catalyst particle. For example, with a 100 µm catalyst particle, useful filler particles are typically about 25 µm in size or smaller.

Typically, filler material that is small compared to the dimension of the sprayed droplet or spray-dried particle are used because relatively large fillers can lead to the formation of undesirable amounts of very small catalyst particles. Too small catalyst particles can contaminate the resin with particulate residues that lead to gel formation. While small fillers can reduce problems associated with gel formation, when they are formed into larger catalyst particles, diffusion-related problems can arise during the subsequent activation and polymerization process. For example, relatively large and dense particles can result in co-catalyst activation of only a shallow region of the particle near its surface because of the co-catalyst's inability to penetrate the interior regions of the particle. Large and dense particles also can inhibit the diffusion of monomers into the interior region of catalyst particles during the polymerization process.

In this disclosure, the particulate filler material can have an average particle size, that is a $D_{50}$ particle size, of less than or equal to about 10 µm, less than or equal to about 5 µm, less than or equal to about 2 µm, less than or equal to about 1 µm, less than or equal to about 0.9 µm, less than or equal to about 0.8 µm, less than or equal to about 0.7 µm, less than or equal to about 0.6 µm, less than or equal to about 0.5 µm, less than or equal to about 0.4 µm, less than or equal to about 0.3 µm, less than or equal to about 0.2 µm, less than or equal to about 0.1 µm, less than or equal to about 0.08 µm, less than or equal to about 0.05 µm, less than or equal to about 0.02 µm, or less than or equal to about 0.01 µm. A practical lower size limit of particulate material is an average particle size, that is a $D_{50}$ particle size, from about 0.005 to about 0.01 µm. For example, the particulate filler material typically has an average particle size ($D_{50}$) of less than or equal to about 1 µm or less than or equal to about 0.1 µm. Further, the particulate filler material can range in average particle size ($D_{50}$) of from about 0.01 µm to about 1 µm, from about 0.02 µm to about 0.9 µm, from about 0.05 µm to about 0.7 µm, from about 0.08 µm to about 0.5 µm, from about 0.1 µm to about 0.4 µm, or from about 0.2 µm to about 0.3 µm. The filler material also should be substantially free of absorbed water, such that any adverse reactions between the filler material and the water-sensitive components in which it will come into contact are reduced, minimized, or eliminated. For example, when untreated fumed silicas are employed as the filler, they optionally can be chemically treated to passivate surface hydroxyl groups.

The amount of filler in terms of weight percent is not critical in this aspect of the disclosure. However, because higher levels of filler increase the viscosity of the slurry to be spray-dried, the most useful amounts of filler may be indicated by the maximum viscosity possible in order for the mixture to be spray-dried.

In one aspect, sufficient filler can be admixed with the solution of magnesium hydrocarbyl carbonate and slurrying agent to produce a slurry containing from about 10 weight percent to about 40 weight percent of the magnesium hydrocarbyl carbonate or from about 2 weight percent to about 10 weight percent of the filler, in the slurry. Based on solid that results from spray drying, a particularly useful amount of filler is from about 4% to about 7% filler by weight in the slurry. However amounts outside these ranges can be used if so desired.

The slurry comprising the carboxylated dihydrocarbyl oxide magnesium compound, the filler, the slurrying agent, and the titanium compound, along with any option transition metal compound different than the titanium compound, is spray dried. Spray-drying may be effected by atomizing the slurry by means of a suitable atomizing device. Atomization is effected by passing the slurry through the atomizer together with an inert drying gas, that is, a gas such as nitrogen or argon which is nonreactive under the atomization conditions employed. An atomizing nozzle or a centrifugal high speed disc can be employed to effect atomization. The volumetric flow of drying gas must considerably exceed the volumetric flow of the slurry to effect atomization of the slurry and removal of excess slurrying agent. Optionally, the drying gas can be heated to a temperature near or greater than the boiling point of the slurrying agent in which the magnesium hydrocarbyl carbonate is dissolved, for example, to as high as about 200° C., to facilitate removal of the solvent. However, if the volumetric flow of drying gas is maintained at a very high level, it is possible to employ temperatures below the boiling point of the slurrying agent. If desired, the slurry may be pre-heated to a temperature up to the boiling point of the slurrying agent before it is admixed with the drying gas. In this aspect, atomization pressures of from about 1 psig to about 200 psig are suitable. Again, there is typically no additional decarboxylation step following the spray-drying step.

The addition of a filler to the slurry before spray-drying typically results in the formation of discrete solid spray dried particles which are full, cohesive, and mostly free of hollow shells and broken shells. While not intending to be bound by a theory, it appears that the addition of filler improves the cohesiveness of liquid droplets, thus allowing them to resist the deforming shear forces exerted on them during spray-drying. The presence of a filler also appears to provide voids in the framework of the sprayed particles, which can act as passageways through which solvent present therein can escape during the spray-drying operation. This feature likely minimizes the formation of hollow particles which are easily shattered during spray-drying and which are undesirable because of the potential for introduction of irregularly shaped particles into the catalyst system and the resulting polymer produced therefrom. In this aspect, the filler may function as an aggregate while the precipitated/crystallized solids act as a cement, increasing the overall strength or robustness of the composite particle much in the same way as sand will increase the strength of cement in the form of mortar.

The Titanium Compound and the Optional Transition Metal Compound Different from the Titanium Compound. As used in this disclosure, the titanium compound and the transition metal compound different from the titanium compound refer to compounds that that are, or can be made to be, polymerization-active for the polymerization of olefins, examples of which include but are not limited to compounds of Ti, Zr, Hf, and V. Moreover, the optional transition metal compound different from the titanium compound are selected from compounds of the Groups 4-6 transition metals, which include Ti, Zr, Hf, V, Nb, Ta, Cr, Mo, and W. Thus, the optional transition metal compound different from the titanium compound can be a compound of titanium that is different from the non-optional titanium compound. Therefore, any compounds of titanium that are disclosed can be used either as the so-called "titanium compound" or as the optional transition metal compound different from the titanium compound. Neither term is used to refer to any magnesium component such as magnesium dihydrocarbyl oxide or magnesium dihydrocarbyl carboxylate materials that constitute the basic support structure of the catalyst precursor particle.

Useful catalyst precursors can be formed by a process comprising contacting the magnesium dihydrocarbyl oxide with the titanium compound and the transition metal compound different than the titanium compound in a slurry to be spray-dried, then spray-drying the slurry. For example, a combination of $Ti(OC_2H_5)_2Cl_2$ and $ZrCl_4$ may be co-sprayed with the magnesium component.

The titanium compound and the transition metal compound (different than the titanium compound) may be supplied in a variety of compositions. Any titanium compounds that are provided in this disclosure can be selected for use either as the so-called titanium compound or as the transition metal compound different than the titanium compound. In this aspect, suitable compounds of titanium that are useful in preparing the catalyst components include, but are not limited to, titanium halides and haloalcoholates corresponding following the general formula $Ti(OR^3)_aX_{4-a}$, $Ti(OR^3)_aY_{4-a}$, or any combination thereof, where:

X is a halide;

a in each occurrence is independently an integer from 0 to 4;

Y is independently selected from an oxygen-bound anionic ligand different than $OR^3$ or a nitrogen-bound anionic ligand, any of which having up to 20 carbon atoms;

$R^3$ in each occurrence is independently a linear or branched, substituted or unsubstituted hydrocarbyl group having from 1 to 20 carbon atoms, where any substituent on $R^3$ is independently a halide or an alkoxide.

In one aspect, typically $R^3$ is independently a linear or branched alkyl group having from 1 to 20 carbon atoms. Moreover, $R^3$ can be a substituted or unsubstituted hydrocarbyl group, such as an unsubstituted, a halide-substituted, or an alkoxide-substituted methyl, ethyl, butyl, hexyl, phenyl, decyl, napthyl, or dodecyl, and the like. further, it is not necessary that a be an integer, as combinations of precursor compounds such as $Ti(OR^3)_4$ and $TiX_4$ in various ratios can provide non-integral values of a. Thus, any combination or mixture of titanium compounds can be employed if desired.

In the titanium compound of formula $Ti(OR^3)_aY_{4-a}$, Y is independently selected from an oxygen-bound anionic ligand different than $OR^3$ or a nitrogen-bound anionic ligand, any or which having up to 20 carbon atoms; a is an integer from 0 to 4; and $R^3$ in each occurrence is independently a linear or branched alkyl group having from 1 to 20 carbon atoms, which can be unsubstituted, halide-substituted, or alkoxide-substituted. Examples of oxygen bound anionic ligands Y include, but are not limited to, aryloxides, alkoxyamines, carboxylacetonates, diolates, carboxylates, and the like, any of which having up to 20 carbon atoms. Specific examples of oxygen bound ligands include, but are not limited to, phenoxide, 2,6-dimethylphenoxide, acetylacetonate, ethylacetoacetate, acetate, and 2-ethylhexane-1,3-diolate. Examples of nitrogen-bound anionic ligands include, but are not limited to, amino ($NH_2$), alkylamino, dialkylamino, arylamino, diarylamino, alkylarylamino, alkylimine, arylimine, and the like. Specific examples of nitrogen-bound anionic ligands include, but are not limited to, NHMe, $NMe_2$, NHEt, $NEt_2$, and NHPh.

In a further aspect, the titanium compound and the transition metal compound (different than the titanium compound) may be selected from bis(acetylacetonate)diisopropoxide titanium, titanium tetraisopropoxide, titanium tetrakis(2-ethylhexoxide), titanium tetra-n-propoxide, bis (acetylacetonate)ethoxide isopropoxide titanium, bis(acetylacetonate)isobutoxide isopropoxide titanium, diisopropoxy-bis ethylacetoacetate titanate, diisobutoxy-bis ethylacetoacetate titanate, tetrakis(2-ethylhexane-1,3-diolate)titanium, or any combination thereof.

This disclosure also provides for the optional use of a transition metal compound different than the titanium compound as a component in the catalyst composition. In this aspect, the transition metal compound different than the titanium compound can be selected from $Zr(OR^4)_bCl_{4-b}$, $Hf(OR^4)_bCl_{4-b}$, $VOCl_3$, or any combination thereof, where b is an integer from 0 to 4, and $R^4$ in each occurrence is an alkyl group having from 1 to 12 carbon atoms. Typically, the transition metal compound is selected from these zirconium, hafnium, or vanadium compounds, though this is not required.

According to another aspect of this disclosure, the titanium compound and the transition metal compound (different than the titanium compound) may be selected from titanium haloalcoholates, with both halide and alkoxide ligands, having from 1 to 10 carbon atoms per alcoholate (alkoxide) group. By way of example, such compounds include, but are not limited to, $Ti(OCH_3)Cl_3$, $Ti(OC_2H_5)Cl_3$, $Ti(OC_4H_9)Cl_3$, $Ti(OC_6H_5)Cl_3$, $Ti(OC_6H_{13})Br_3$, $Ti(OC_8H_{17})Cl_3$, $Ti(OCH_3)_2Br_2$, $Ti(OC_2H_5)_2Cl_2$, $Ti(OC_6H_{13})_2Cl_2$, $Ti(OC_8H_{17})_2Br_2$, $Ti(OCH_3)_3Br$, $Ti(OC_2H_5)_3Cl$, $Ti(OC_4H_9)_3Cl$, $Ti(OC_6H_{13})_3Br$, $Ti(OC_8H_{17})_3Cl$, and any combination thereof. In this aspect, the starting material for forming the titanium halide alkoxide compounds (haloalcoholates) can be titanium halide compounds, e.g. $TiC_4$ or $TiBr_4$, which are contacted with alcohols and undergo substitution of at least one halide ligand with an alcoholate ligand. In a further aspect, the titanium compounds provided in this disclosure are capable of being halogenated, typically chlorinated, in the subsequent halogenation step. Thus, the transition metal compound different than the titanium compound that is specified herein may be selected from a titanium compound having the formula $Ti(OR^5)_cX^1_{4-c}$, or any combination of compounds of this formula, where $X^1$ is Cl, Br, or I; c is an integer from 0 to 3; and $R^5$ in each occurrence is an alkyl group having from 1 to 12 carbon atoms.

In other aspects, any titanium-containing compound, whether the titanium compound or the transition metal compound different than the titanium compound, may be a reduced titanium compound, such as a reduced titanium halide. Useful reduced titanium halides generally follow the formula $TiX^2_d$ where $X^2$ is a halide, typically Cl, Br, or I, and d ranges from greater than 0 to less than 4. In this aspect, a reduced titanium-containing compounds can have titanium in the +3 formal oxidation states, including for example, a compound selected from $TiCl_3$, $TiBr_3$, $TiI_3$, or combinations thereof.

The quantity of a transition metal compounds, meaning the combination of the titanium compound and the transition metal compound different than the titanium compound, used in preparing catalysts precursors may vary widely depending on the type of catalyst desired. In one aspect, for example, the molar ratio of magnesium to the total moles of transition metal compound(s) may be up to about 60, up to about 30, up to about 20, up to about 15, or up to about 10. In a further aspect, for example, the molar ratio of magnesium to the total moles of transition metal compound(s) may be as low as about 2, about 3, about 4, about 5, about 6, about 7, about 8, about 9, about 10, or any range therebetween. Generally, the molar ratio of magnesium to the total moles of transition metal compound(s) may be from about 1 to about 10, from about 2 to about 8, or from about 3 to about 6.

In a further aspect, the molar ratio of the titanium compound to the transition metal compound different than the titanium compound, used in preparing catalysts precursors also may vary widely. For example, the molar ratio of the titanium compound to the transition metal compound different than the titanium compound can range from about 10:1 to about 0.5:1, from about 7:1 to about 0.75:1 or from about 5:1 to about 1:1.

Spray-Drying. The spray-drying method used to prepare the catalyst components produces discrete, substantially spherical, abrasion-resistant particles with a relatively narrow particle size distribution. By adjusting the speed of the atomizer wheel or the size of the orifices of the atomizer nozzle employed during spray-drying, it is possible to obtain particles having an average particle size of from about 2 μm to about 200 μm, typically from about 5 μm to about 50 μm, or from about 10 μm to about 30 μm.

The final, solid spray-dried particles produced according to this method may contain components that are oils or liquids in their own right, while retaining a solid structure. While not intending to be bound by theory, it is believed that this feature is assisted by the presence of the microparticulate filler and the magnesium component. The resulting assembly serves as a solid component and binder and forms the porous solid particle, which has sufficient structural integrity to hold together in a solid structure. The BET surface areas of the resulting catalyst composition are reported in Examples 1-4. Further, the number, amount, and molar ratios of metal compounds can likewise be adjusted through the slurry composition, where components are selected to avoid, minimize, or control any undesired reactions of any components with the solvent or other components of the slurry that would interfere in the spray-drying process, the solidification of the dried particles, or the utility of the material for its desired end use. For example, undesired reactions could include catalyst poisoning; excess softening of the particles, or embrittlement of the particles.

The Halogenating Agent. As provided in this disclosure, the solid particulate catalyst precursor is partially halogenated in order to form the precatalyst that subsequently will be contacted with an activating co-catalyst such as a trialkyl aluminum compound, to form the active catalyst. Thus, while halogenation including chlorination of the catalyst precursors of this disclosure may be conducted in any manner, halogenation under more forcing conditions typically results in a catalyst producing a more narrow molecular weight distribution polymer with less of the high molecular weight tail, while halogenation under less forcing conditions provides a catalyst producing a broader narrow molecular weight distribution polymer, including more of a high molecular weight tail. Forcing conditions include increasing the inherent propensity or strength of halogenation of the halogenation agent, specifically propensity to exchange alkoxide for halide/chloride ligands, increasing the relative amount or concentration of the agent, or increasing the reaction temperature employed in the halogenation reaction. In this aspect, for example, using a relatively strong chlorinating agent such $EtAlCl_2$ or increasing the reaction temperature used with the chlorinating agent are expected to provide more catalytic sites that form a polymer with a more narrow molecular weight distribution with less of the high molecular weight tail.

Chlorinations and other halogenations can be conducted in a single stage, or in two or more stages. In one aspect, because partial chlorination (or other halogenation) of the total number of available sites that are susceptible to chlorination may be desired, the chlorination reaction is typically conducted under relatively mild conditions, as defined in this disclosure. In one aspect, when conducting a single stage halogenation, if partial halogenation of the catalyst sites are desired, the solid particulate catalyst precursor can be contacted with:

i) at least one mild first halogenating agent and at least one strong second halogenating agent in succession, under conditions which partially halogenate the catalyst precursor; or ii) at least one strong halogenating agent under conditions which partially halogenate the catalyst precursor.

Halogenation can include chlorination, bromination, or iodination, and chlorination typically is described in this disclosure as exemplary of halogenation. As disclosed, "mild" conditions refers to contacting the precursor with a halogenation agent under conditions that lead to partial, rather than exhaustive, halogenation of the catalyst precursor. That is, mild conditions lead to partial chlorination (or other halogenation) of the total number of available sites that are susceptible to chlorination. Conversely, "forcing" or "strong" conditions refer to contacting the precursor with a halogenation agent under conditions that lead to exhaustive, rather than partial, halogenation of the catalyst precursor. That is, forcing conditions lead to exhaustive chlorination (or other halogenation) of the total number of available sites that are susceptible to chlorination. For example, one aspect of this disclosure provides that the partially halogenating step comprises contacting the solid particles of catalyst precursor with the halogenating agent(s) at a temperature from about 35° C. to about 90° C., from about 35° C. to about 80° C., from about 35° C. to about 70° C., from about 35° C. to about 60° C., or from about 35° C. to about 50° C. Halogenation is typically carried out from about 35° C. to about 70° C.

In one feature of this disclosure, mild and strong halogenation or chlorination agents are used to describe the relative inherent propensity of the agent to undergo halide ligand exchange with the particular spray-dried contact product or mixture that is subjected to halogenation. For example, mild chlorinating agents can be selected from a compound having the formula $X^3_e$, $ER^6_f$, $X^3_eE(OR^6)_f$, or any combination thereof, where:

$X^3$ is Cl, Br, or I;

E is C, Si, Ge, Sn, Ti, B, Al, Ga, or In;

$R^6$ in each occurrence is independently an alkyl group having from 1 to 12 carbon atoms;

e is a number greater than or equal to 1; and e+f is the valence of E.

The mild chlorinating agents of the formulas $X^3_eER^6_f$ and $X^3_eE(OR^6)_f$ can be non-reducing oxyphilic compounds which are capable of exchanging a chloride for a hydrocarbyl ligand. Typically, a is 1 or 2 and b is the valence of E minus a in the formulas $X^3_eER^6_f$ and $X^3_eE(OR^6)_f$.

A further aspect of the disclosure provides for specific examples of mild first halogenating agents that include, but are not limited to:

a) $(CH_3)_2SiCl_2$, $(CH_3)_3SiCl$, $(CH_3O)_3SiCl$, $(C_2H_5O)_3SiCl$, $TiCl_3$, $TiCl_4$, $(C_2H_5O)_3TiCl$, $(C_2H_5O)_2TiBr_2$, $(C_3H_7O)_3TiCl$, $(C_3H_7O)_2TiCl_2$, $(C_4H_9O)_3TiCl$, $(C_4H_9O)_2TiCl_2$, $(C_6H_{13}O)_3TiCl$, $(C_6H_{13}O)_2TiCl_2$, $(C_6H_{13}O)_2TiBr_2$, $(CH_3)_2AlCl$, $(C_2H_5)_2AlCl$, or any combination thereof;

b) $CH_3Cl$, $CH_2Cl_2$, $CHCl_3$, $CCl_4$, $SiCl_4$, $C_6H_5Cl$, or any combination thereof;

c) a mixture of $Ti(OR^7)_4$ and $TiX^4_4$ in any ratio that provides a reagent having a nominal formula $Ti(OR^7)_g X^4_{4-g}$, where $R^7$ in each occurrence is an alkyl group having from 1 to 12 carbon atoms, $X^4$ is a halide, and g is a number from about 0.2 and about 3.8; or d) any combination thereof.

Thus, any combination of these mild first halogenating agents can be employed.

Yet another aspect of this disclosure provides for at least one relatively strong second halogenating agent, which can be used under mild conditions at the same time as the mild first halogenating agent, subsequent to the mild first halogenating agent, or without a mild first halogenating agent. Specific examples of strong second halogenating agents include, but are not limited to $AlCl_3$, $BCl_3$, $R^8AlCl_2$, $R^8BCl_2$, $R^8{}_3Al_2Cl_3$, $TiCl_4$, $C_6H_5Cl$, or any combination thereof, where $R^8$ in each occurrence is independently an alkyl group having from 1 to 12 carbon atoms. Then $TiCl_4$ is employed in the second stage chlorination, the titanium to magnesium molar ratio can be from about 0:1 to about 3:1, or from about 0.5:1 to about 2:1, though these ratios are not critical.

As illustrated previously, in some aspect the halogenating agent, the titanium compound, and the optional transition metal compound different from the titanium compound, each can be selected from among the compounds represented by the same general formula of titanium compounds. For example, suitable titanium compounds that can serve each purpose include, but are not limited to, compounds having the general formula $TiX^5{}_h(OR^9)_{4-h}$, where h is an integer from 0 to 4, inclusive, $X^5$ is chloride or bromide, and $R^9$ in each occurrence is a hydrocarbyl ligand having up to 10 carbon atoms. Typically, h is an integer from 1 to 4. Examples of halogenated titanium compounds that can function both the titanium compound and the optional transition metal compound different from the titanium compound, as well as a halogenating agent include, but are not limited to, $TiCl_4$, $Ti(OC_2H_5)_2Cl_2$, $Ti(OC_2H_5)_3Cl$, $TiO(OC_3H_7)_2Cl_2$, $Ti(OC_3H_7)_3Cl$, $Ti(OC_4H_9)_3Cl$, $Ti(OC_3H_7)_2Cl_2$, or any combination thereof. Thus, a transition metal component such as $TiCl_4$ can serve as a relatively stronger or a more mild halogenating agent, depending upon the conditions and the particular magnesium dihydrocarbyl oxide in the particle precursor.

The Mg/Ti/metal compositions that are brought together by spray-drying are halogenated to afford the halogenated catalyst precursor, which is subsequently activated with a co-catalyst to afford the active catalyst. In one aspect, the active catalyst precursors will have a molar (atomic) Mg/Ti ratio of at least about 3. In one aspect, the molar (atomic) Mg/Ti ratio in the catalyst precursor can be from about 3 to about 7, from about 3 to about 6, or from about 3 on about 6. This aspect of the disclosure are illustrated in the Examples.

While not bound by theory, it is thought that the use of "not-too-mild" and "not-too-strong" chlorination procedures are helpful to generating the mixed environments for the active sites, that is, more than one type of active site is present in or on the catalyst which affords the polymer product. Typically, chlorination with excess of chloride over that required by the metal valence is applied under mild conditions, such that exhaustive chlorination does not occur. Again, while not theory bound, it is thought that in this aspect specific chlorination with chlorinating agents incorporates titanium bound to the metal oxide or alkoxide lattice.

Catalyst Preparation and Use

Any of the particulate catalyst precursors of this disclosure that comprise the magnesium dihydrocarbyl oxide and at least one transition metal compound can be used to generate the active catalyst as follows. The catalyst precursors prepared according to this disclosure typically are treated with an activating co-catalyst to generate the active catalyst. The halogenated catalyst precursor may be treated with the activating co-catalyst at any point after the spray-drying operation. For example, the halogenated catalyst precursor may be treated with the activating co-catalyst in the line that feeds the halogenated catalyst precursor into the reactor. Further, the precursor can be activated before any optional treatment with a Lewis acid or an alkylating agent, or in another aspect, the precursor can be treated with the co-catalyst after any optional Lewis acid or alkylating agent treatment. Typical activating co-catalysts include the organoaluminum compounds having the general formula $AlR^{10}{}_3$, where $R^{10}$ in each occurrence is independently a saturated hydrocarbon groups having from 1 to 14 carbon atoms and are optionally substituted with one or more substituents which are inert under the polymerization reaction conditions employed. Exemplary co-catalysts include, for example, $Al(CH_3)_3$, $Al(C_2H_5)_3$, $Al(i-C_4H_9)_3$, $Al(C_6H_{13})_3$, $Al(C_8H_{17})_3$, or any combination or mixture thereof.

In one aspect of this disclosure, co-catalyst can be added to the polymerization reactor to activate the catalyst precursor. In this aspect, the catalyst precursor composition and co-catalyst can be fed into the reactor by separate feed lines. In other aspects, a mineral oil suspension of the catalyst and the co-catalyst are supplied in one feed line to the reactor. Alternatively, a mineral oil slurry of the precursor composition can be treated with the co-catalyst, and the resultant slurry can be fed into the reactor. The co-catalyst also may be sprayed into the reactor as the pure component or in the form of a solution thereof in a hydrocarbon solvent such as isopentane, hexane, or mineral oil. This solution usually can contain from about 2 to about 30 weight percent of the co-catalyst composition. The co-catalyst may also be added to the reactor in solid form, by being absorbed on a support. In this aspect, for example, the support can contain about 10 to about 50 weight percent of the activator for this purpose. The additional co-catalyst can be added to the reactor in such amounts to produce, in the reactor, a total Al/Ti molar ratio of about 10, about 15, about 25, about 35, about 45, about 60, about 100, or about 200 to 1. In further aspects, the ratio may be about 250 or about 400 to 1. The additional amounts of activator compound added to the reactor further activate the supported catalyst. Further aspects of catalyst formation by activating the co-catalyst are described in PCT Publication No. WO 2001/05845 (Jorgensen), incorporated herein by reference in its entirety.

Various examples or embodiments of the catalysts described previously may be used in solution, slurry, or gas-phase polymerizations. Catalysts may be prepared for use in slurry polymerization according to any suitable techniques. For example, in some aspects, such catalysts are prepared in the same manner as those used in gas phase polymerizations. Slurry polymerization conditions include polymerization or copolymerization of $C_2$ to $C_{20}$ olefins, diolefins, cycloolefins, or any mixture or combination thereof in an aliphatic solvent at a temperature below that at which the polymer is readily soluble in the presence of the supported catalyst. Slurry phase processes suited for ethylene homopolymerization and copolymerizations of ethylene with $C_3$ to $C_8$ α-olefins, such as for example, 1-butene, 1-hexene, 4-methyl-1-pentene, and 1-octene, may also be performed with the inventive catalysts.

Polymerization reactions are typically conducted by contacting a stream of ethylene, in a gas phase process, such as in the fluid bed process described infra, with a catalytically effective amount of the completely activated precursor composition (the catalyst) at a temperature and at a pressure sufficient to initiate the polymerization reaction. Polymerizations typically are conducted under conditions that seek to minimize or eliminate the detectable amounts of catalyst poisons such as moisture, oxygen, CO, $CO_2$, and acetylene. The catalysts disclosed herein are suitable for the polymerization of $C_2$-$C_8$ olefins including homopolymers and copolymers of ethylene with α-olefins such as, 1-butene, 1-hexene, and 4-methyl-1-pentene, or with diene monomers such as 1,3-butadiene. In general, the reaction may be performed at any conditions suitable for Ziegler-Natta type polymerizations conducted under slurry or gas phase conditions. Such processes are used commercially for the production of high density polyethylene (HDPE), medium density polyethylene (MDPE), very low density polyethylene (VLDPE), and linear low density polyethylene (LLDPE). Generally, polyethylene densities can range from about 0.87 to about 0.975 $g/cm^3$.

A fluidized bed reaction system can be used in gas phase polymerizations using the disclosed catalysts. Fluid bed reaction systems are discussed in detail in U.S. Pat. Nos. 4,302,565; 4,379,759; and 7,160,833, each of which is incorporated herein by reference in its entirety.

Polyethylene Resins Generated Using the Catalysts

Figure 2:
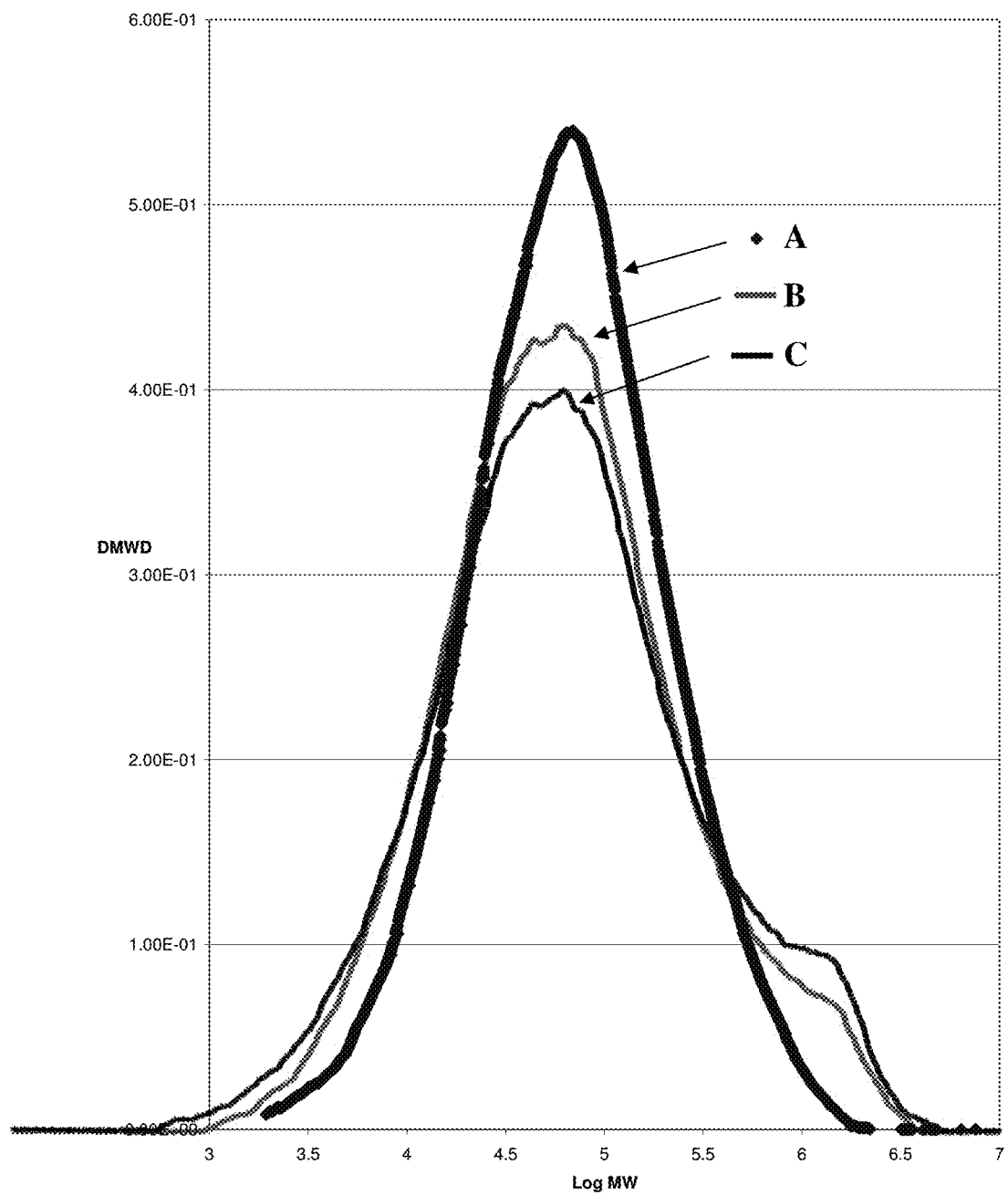
FIG. 2 is a plot of the molecular weight distribution of gas phase resins polymerized at 85° C., using catalysts according to this disclosure. A. polymer from Example 20-Comp (comparative); B. polymer from Example 27 Comp (comparative); and C. polymer from Example 13 using co-sprayed Mg/Ti.

Polyethylene resins prepared from many Ziegler-Natta catalysts of the general formula $MgCl_2/TiCl_{3 \, or \, 4}$ typically feature a molecular weight distribution $M_w/M_n$ of from about 3.2 to about 4.5. Similarly, these resins are characterized by a melt flow ratio $I_{21}/I_2$ f from about 25 to about 32. However, these catalysts do not provide a high molecular weight tail within the molecular weight distribution of the resulting polyethylene resin. The catalyst and methods of the present disclosure provide such polymers, as illustrated in FIGS. 1 and 2, and the Examples provided.

Moreover, the methods of this disclosure allow the high molecular weight tail and the MW distribution in the tail to be adjusted. In this aspect, the single-step spray-drying of mixtures of magnesium hydrocarbyl carbonates with titanium compounds leads to solid, round catalyst precursors which, after chlorination, can be used to form Ziegler-Natta catalysts that produce resins having a high molecular weight tail centered near one million molecular weight. In this aspect, some resins provided in the present disclosure are similar to those described in U.S. Pat. No. 5,124,298 (Job), which is incorporated herein by reference in its entirety. If desired, additional polymerization-active metal components may be added to the spray-drying slurry in addition to, or even as substitutes for the titanium component, to obtain high molecular weight tails with very specific, designed molecular architectures.

Moreover, the catalyst composition can be regulated to provide the desired loading of metals and fillers by choosing the appropriate composition in the slurry to be spray-dried. In this aspect, the spray-dried slurry is continuously adjustable. The amount of the added polymerization-active component can be chosen to provide a catalyst activity that fits the needs of the polymerization process, and inert fillers may be added to bulk up the particle and to provide porosity. The glassy, non-crystalline nature of the magnesium hydrocarbyl carbonate component which forms the matrix of the solid solution of metal components in the spray-dried particle permits embedding of either solid or liquid transition metal components, even in the absence of a chemical reaction between the magnesium matrix component and the titanium or other transition metal component.

The polyethylene resins generated using the catalysts provided in this disclosure have a wide utility. For example, fabricated articles made from the present polyethylene resins may be prepared using all of the conventional polyolefin processing techniques. Useful articles include, but are not limited to, films (for example, cast, blown and extrusion coated), fibers (for example, staple fibers, including use of an olefin polymer disclosed here as at least one component comprising at least a portion of the fiber's surface), spun-bond fibers or melt blown fibers (using, for example, systems as disclosed in U.S. Pat. No. 4,663,220 (Wisneski et al.), U.S. Pat. No. 4,668,566 (Braun), or U.S. Pat. No. 4,322,027 (Reba), all of which are incorporated herein by reference in their entireties), and gel spun fibers (for example, the system disclosed in U.S. Pat. No. 4,413,110 (Kavesh et al.), incorporated herein by reference in its entirety), both woven and nonwoven fabrics (for example, spunlaced fabrics as disclosed in U.S. Pat. No. 3,485,706 (Evans), incorporated herein by reference in its entirety) or structures made from such fibers (including, for example, blends of these fibers with other fibers, such as PET or cotton) and molded articles (for example, made using an injection molding process, a blow molding process or a rotomolding process). The polymers described here are also useful for wire and cable coating operations, as well as in sheet extrusion for vacuum forming operations.

This disclosure is further illustrated by the following examples, which are not to be construed in any way as imposing limitations upon the scope of any invention described in this disclosure. On the contrary, it is to be understood that resort may be had to various other aspects, embodiments, modifications, and equivalents thereof which, after reading this disclosure, may suggest themselves to one of ordinary skill in the art without departing from the spirit of the present invention or the scope of the appended claims. Thus, other aspects of this invention will be apparent to those skilled in the art from consideration of the specification and practice of the invention disclosed herein.

Unless otherwise indicated, all manipulations are carried out under an inert atmosphere such as dry dinitrogen, and all solvents used typically are dried prior to use using standard techniques. Reagents are obtained from commercial sources such as Aldrich Chemical Company (Milwaukee, Wis.) and are either used as received or purified using standard techniques as necessary. When a particular mixed halide-alkoxide metal compound is used in a preparation, the compound can be obtained from commercial sources, prepared according to literature techniques, or can be prepared by combining the corresponding binary metal halide (for example $HfCl_4$) and corresponding homoleptic metal alkoxide (for example, $Hf(OEt)_4$) in an appropriate molar ratio, in a suitable solvent.

Unless indicated otherwise, when a range of any type is disclosed or claimed, for example a range of weight percents, particles sizes, time periods, and the like, it is intended to disclose or claim individually each possible number that such a range could reasonably encompass, including any sub-ranges encompassed therein. For example, when the Applicants disclose or claim a weight percent can be from about 30% to about 40%, Applicants' intent is to disclose or claim individually every possible number that such a range could encompass, consistent with the disclosure herein. Thus, by the disclosure that a weight percent can be from about 30% to about 40%, Applicants intend to recite that the weight percent can be about 30%, about 31%, about 32%, about 33%, about 34%, about 35%, about 36%, about 37%, about 38%, about 39%, or about 40%, including any ranges, sub-ranges, or combinations thereof between any disclosed values. Accordingly, Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants are unaware of at the time of the filing of the application.

The term "substantially spherical" morphology or form refers to a three-dimensional body having an aspect ratio (ratio of its long axis to short axis) between 1 and 1.5, or between 1 and 1.25.

The term "substantially free of absorbed water," when referring to the filler material, indicates the filler material is sufficiently dry to reduce, minimize, or eliminate any adverse reactions between the filler material and the water-sensitive components in which it will come into contact. Therefore, this feature depends on the degree of moisture sensitivity of the components which the filler will contact. In one aspect, "substantially free of absorbed water" means less than 1%, less than 0.1%, less than 0.01%, or less than 0.001% by weight water.

The transition metal reagents could be obtained from commercial sources, or are prepared according to standard laboratory procedures. By way of example, compounds having the formula $Ti(OR^3)_2Y_2$ according to the disclosure which are readily obtained from commercial sources include bis(acetylacetonate)diisopropoxide titanium (17927-72-9), selected from titanium tetraisopropoxide (546-68-9), titanium tetrakis (2-ethylhexoxide) (1070-10-6), titanium tetra-n-propoxide (3087-37-4), bis(acetylacetonate)ethoxide isopropoxide titanium (445-398-76-5), bis(acetylacetonate) isobutoxide isopropoxide titanium (97281-09-9), diisopropoxy-bis ethylacetoacetate titanate (27858-32-8), diisobutoxy-bis ethylacetoacetate titanate (83877-91-2), and tetrakis (2-ethylhexane-1,3-diolate) titanium (5575-43-9).

The spray-drying method employed to prepare the catalyst precursor particles disclosed herein is disclosed in U.S. Pat. No. 6,982,237 (Wagner, et al.); U.S. Pat. No. 6,806,221 (Wagner, et al.); and U.S. Pat. No. 7,160,833 (Wagner, et al.); the entireties of which are incorporated herein by reference. The specific spray-drying equipment used is a Michi Model 190 spray-drier, as described in U.S. Pat. No. 5,672,669 (Wasserman, et al.), the entirety of which is incorporated herein by reference.

The properties of the polymers produced according to the Examples are determined by the following test methods.

Melt Index (MI or $I_2$) is determined according to ASTM D-1238, Condition E, measured at 190° C., using an applied load of 2.16 kilogram (kg) and reported as grams per 10 minutes.

High Load Melt Index (HLMI or $I_{21}$) is determined according to ASTM D-1238, Condition F, measured at 190° C., using a 21.6 kilogram weight and reported as grams per 10 minutes.

Melt Flow Ratio (MFR) is the ratio of the High Load Melt Index (HLMI or $I_{21}$) to the Melt Index (MI or $I_2$). This value generally correlates with the molecular weight distribution of the product polymer, with lower MFRs indicating narrower molecular weight distributions.

Some polymers are characterized by $I_5$, which is determined according in an analogous manner as $I_2$ according to ASTM D-1238 at 190° C., except $I_5$ is measured using a 5.0 kilogram applied load instead of the 2.16 kilogram applied load used to measure $I_2$. $I_5$ is reported as grams per 10 minutes.

Catalyst productivity can be measured by ashing a sample of the resin product and determining the weight percent of ash obtained. The amount of Ti in the ash can be determined by ICP (inductively coupled plasma) spectroscopy. Productivity can be expressed in terms of parts per million of Ti in the polymer. Alternately, the amount of residual Ti in the resin can be measured using X-Ray Fluorescence. A resin plaque is prepared and measurement is compared to a standard curve. The standard curve is prepared using resins that have been analyzed for residual Ti using the ICP method.

Fines are measured and reported as weight percent of polymer particles which passed through a 120 mesh U.S. Standard screen.

Average resin particle size is calculated from sieve analysis data according to ASTM D-1921, Method A, using a 500-g sample. Calculations are based on weight fractions retained on the screens.

Bulk density is measured according to ASTM D-1895, Method B.

Support or catalyst particle size is determined and reported as follows. As used herein, the term D10, D50 and D90 indicate the respective percentiles of log normal particle size distribution determined by means of a of a Malvern Mastersizer® 2000 particle size analyzer using hexane solvent. Thus, for example, catalyst particles having a D50 of 25 μm have a median particle size of 25 μm. A D90 of 45 μm indicates that 90% of the particles have a particle size of less than 45 μm, and a D10 of 8 μm indicates that 10% of the particles have a particle size of less than 8 μm. The width or narrowness of a particle size distribution can be given by its span, which is defined as (D90−D10)/(D50).

The fumed silica that is used as filler is Cab-O-Sil® TS-610 (Cabot Corporation), having a nominal average particle length (aggregate) of 0.2-0.3 μm. The $TiO_2$ that is used as filler is obtained from Aldrich Chemical Company (Aldrich No. 224,227; rutile), and has an average particle size of about 1 μm. The nominal particle size of this material is less than 5 μm.

Comparative Examples are indicated by the use of "Comp" before the example number.

All publications and patents mentioned in the disclosure of this invention are incorporated herein by reference in their entireties, for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention. Should the usage or terminology used in any reference that is incorporated by reference conflict with the usage or terminology used in this disclosure, the usage and terminology of this disclosure controls. The Abstract of the disclosure is provided to satisfy the requirements of 37 C.F.R. § 1.72 and the purpose stated in 37 C.F.R. § 1.72(b) "to enable the United States Patent and Trademark Office and the public generally to determine quickly from a cursory inspection the nature and gist of the technical disclosure." The Abstract is not intended to be used to construe the scope of the appended claims or to limit the scope of the subject matter disclosed herein. Any use of the past tense to describe an example otherwise indicated as constructive or prophetic is not intended to reflect that the constructive or prophetic example has actually been carried out.

EXAMPLES

Examples 1-4

Preparation of Spray-Dried Particulate Catalyst Precursors (Co-Sprays)

The following general preparative method is used to prepare the spray-dried particulate catalyst precursors of Examples 1-4 provided in Table 1, and is generally applicable to all spray-dried particulate catalyst precursors of this disclosure.

For Examples 1-4, the following components are employed: magnesium component, magnesium ethoxide treated to saturation with $CO_2$; titanium compound, titanium diisopropoxide bis(acetylacetonate) (Aldrich Chemical Co.); transition metal compound different than titanium compound, hafnium tetrachloride; filler, Cab-O-Sil® TS-610 (Cabot Corporation). Examples 1-4 are prepared using spray drying equipment in U.S. Pat. No. 7,160,833 (Wagner et al.).

A slurry is prepared by combining the ethanol, the magnesium source, the titanium source, and optionally the second metal source as indicated in Table 1. This mixture is prepared by stirring the components from about 1 to about 3 hours. When the magnesium source is magnesium ethoxide as in Examples 1-4, the $Mg(OEt)_2$ is first solubilized as it is converted to magnesium ethyl carbonate upon treatment of the $Mg(OEt)_2$ slurry to saturation with $CO_2$. Alternatively, other solubilizing agents as described in U.S. Pat. No. 5,604,172 (Wagner, et al.) and U.S. Pat. No. 5,034,361 (Job, et al.) could be used. The fumed silica filler Cab-O-Sil® TS-610 (Cabot Corporation) is added to the slurry, after which the slurry is spray dried in a rotary wheel spray-drier from about 15 kg/hr to about 20 kg/hr slurry feed under the process conditions indicated in Table 1. Freely flowing, spherical particles having a relatively narrow particle size distribution are obtained from this process. A typical photomicrograph of the precursor particles prepared in this manner is shown in FIG. 1. The atomizer wheel utilized in these examples has a 120 mm diameter and four equally spaced nozzles for slurry exit. 100% speed is 24,000 RPM.

TABLE 1

General preparative method and particle characterization of spray-dried particulate catalyst precursors of Examples 1-4.

| Parameter | Example No. | | | |
|---|---|---|---|---|
| | 1 | 2 | 3 | 4 |
| Reagent | | | | |
| Ethanol, kg | 12.64 | 17.6 | 17.6 | 17.6 |
| Magnesium component, mol | 6.47 | 8.7 | 8.7 | 8.62 |
| Titanium component, mol | 2 | 2.86 | 2.86 | 2.86 |
| Second metal component, mol | — | — | — | $3HfCl_4$ |
| Filler, g | 1170 | 1600 | 1600 | 1550 |
| Spray-dryer Parameters | | | | |
| Inlet Temp, ° C. | 160 | 160 | 145 | 160 |
| Outlet Temp, ° C. | 100 | 100 | 91.5 | 100 |
| Atomizer Speed, % | 95 | 95 | 95 | 95 |
| Analysis of spray-dried product: | | | | |
| Mg, % | 5.39 | 4.8 | — | 3.89 |
| Ti, % | 3.33 | 3.5 | — | 2.9 |
| Hf, % | 0 | 0 | — | 10.5 |
| Si, % | 27.32 | 21.22 | — | 15.16 |
| (Mg/Ti) charged/ (Mg/Ti) found | 1.01 | 1.1 | 1.1 | 1.1 |
| Particle Size, μm | | | | |
| D(10) | 14.2 | 14 | 13.1 | 14.9 |
| D(50) | 26.1 | 24.5 | 23 | 26.3 |
| D(90) | 43.1 | 41.9 | 39.5 | 45.1 |
| Span | 1.15 | 1.39 | 1.15 | 1.15 |

As illustrated in Table 1, the ratio of components, the concentration of components, and the filler content in the spray-dried solid particles could be controlled by adjusting the recipe of the slurry to be spray-dried.

The spray-dried particulate catalyst precursors prepared in this manner may be scaled-up, and also may be chlorinated in hydrocarbon slurry. Once chlorinated, the resulting slurry, optionally further diluted with mineral oil, can be used directly in the polymerization process. An aliquot of the hydrocarbon slurry is washed several times with hexane and dried. A scanning electron microscopic (SEM) analysis indicates that the spherical morphology of the precursor particles is maintained throughout the chlorination. The BET surface areas of the resulting catalyst composition ranges from 3 $m^2/g$ to 150 $m^2/g$, with single point BET pore volumes ranging from 0.05 $cm^3/g$ to 0.4 $cm^3/g$ using the catalyst precursors from Examples 1-4.

Examples 5-8

Preparation of Spray-Dried Particulate Catalyst Precursors

The general preparative method used in Examples 1-4 also can be used prepare the spray-dried particulate catalyst precursors as illustrated in Examples 5-8 provided in Table 2. As illustrated, the ratio of components, the concentration of components, and the filler content in the spray-dried solid particles, and similar variables can be controlled by adjusting the recipe of the slurry to be spray-dried.

TABLE 2

Examples of spray-dried particulate catalyst precursors.

| | Example No. | | | | |
|---|---|---|---|---|---|
| Parameter | 5 | 6a | 6b | 7 | 8 |
| Reagent | | | | | |
| Slurrying agent | ethanol 17.6 kg | methanol | ethanol | ethanol | ethanol |
| Magnesium component | $Mg(OEt)_2$ 8.65 mol | $Mg(OMe)_2$ | $Mg(OEt)_2$ | $Mg(OEt)_2$ | $Mg(OEt)_2$ |
| First metal component | $Ti(OEt)_2$-$(acac)_2$[A] 3.0 mol | $Ti(OEt)_4$ | $Ti(OEt)_4$ | $Ti(O\text{—}i\text{-}Pr)_4$ | $Ti(OEt)_2$-$(etacac)_2$[A] |
| Second metal component | $VOCl_3$/EtOH 3 mol | $Hf(OEt)_2Cl_2$ | $Hf(OEt)_2Cl_2$ | $ZrCl_4$ | — |
| Filler | Cab-O-Sil® TS-610 1600 g | Cab-O-Sil® TS-610 | Cab-O-Sil® TS-610 | Cab-O-Sil® TS-610 | $TiO_2$ |
| Spray-dryer Parameters | | | | | |
| Inlet Temp, °C. | 160 | 160 | 160 | 145 | 145-160 |
| Outlet Temp, °C. | 100 | 95 | 95 | 95 | 100 |
| Atomizer Speed, % | 95 | 95 | 95 | 95 | 95 |

[A] acac, acetylacetonate; etacac, ethylacetoacetate.

Example 9

Preparation of a Chlorinated Mg/Ti Co-Sprayed Particulate Catalyst Precursor

A Mg/Ti catalyst precursor containing about a 5.3:1 Mg/Ti ratio (3.85 mmol Mg/g precursor; 0.73 mmol Ti/g precursor) is spray-dried as described in Examples 5-8. A 24 g-sample of the spray-dried precursor is slurried in 100 mL of hexane, and a toluene solution containing 88 mL of a toluene, 100 mmol of $SiCl_4$, and optionally 23 mmol of $TiCl_4$ are added. The slurry is stirred for 30 minutes at room temperature, after which time 17.8 g of solids are separated by filtration. The solids are then added to 100 mL of hexane in a 250 mL sidearm flask under nitrogen, and 59.2 mL of 1.8 M $EtAlCl_2$ (106 mmol) are added over 30 min. The temperature is kept below 60° C. by cooling of the flask in an ice bath. The slurry is stirred an additional 30 min, the solid is filtered off, washed three times with hexane, and dried. Elemental Analysis: 10.4% Mg, 1.0% Ti, and 5.35% Al.

Other variants of this chlorination procedure are feasible, yielding catalysts of differing activities and polymerization properties (see slurry polymerization Examples 12-19). Parameters that can be adjusted include, for example, the molar ratio of Mg to Ti in the catalyst precursor, with an increase in the percent Ti expecting to provide more titanium in the precursor and typically lower catalyst activity. In increase in the relative amount, concentration, or reaction temperature used with the stronger chlorinating agent $EtAlCl_2$ is expected to provide more catalytic sites that will provide a polymer with a more narrow molecular weight distribution with less of the high molecular weight tail.

Example 10

Preparation of a Chlorinated Mg/Ti/Hf Co-Sprayed Catalyst Precursor Chlorinated In Situ with a Strong Halogenating Agent An 11 g-sample of a Mg/Ti/Hf co-sprayed catalyst precursor prepared as described in Example 4 and comprising 23.8 mmol Mg, 5 mmol Ti, and 5.5 mmol Hf, is slurried with 35 g of mineral oil in a 250 mL sidearm flask equipped with a paddle stirrer and a thermometer. The reaction vessel is kept under nitrogen, with a bubbler allowing both venting and monitoring of gas evolution. The flask is stirred at room temperature in an ice-bath to maintain the reaction temperature below about 40° C. To this slurry is added dropwise 43.1 g of 30% EASC (ethyl-aluminum sesquichloride) in mineral oil (180 mmol chloride, ca. 2 equivalents of chloride per equivalent required by the cation) over a period of one hour. Thus, sufficient EASC to deliver about 2 equivalents of chloride per equivalent of Mg and about 4 equivalents of chloride per equivalent of Ti or Hf is employed. A 10° C. exotherm is noted as the first 0.5 equivalent of EASC had been added, and gas evolution is observed during the addition of the first equivalent of chloride. The resulting uniform, red-brown slurry is stirred for 4 hours, after which the slurry is used in this form for polymerization studies. Slurry analysis:molar composition $Mg_{4.52}Ti_1Hf_{0.9}$; ca. 13.3 wt % solids in mineral oil.

Example 11

Preparation of a Comparative Precipitated Precursor and its Chlorinated Product

A Mg/Ti catalyst precursor is prepared according to illustrative embodiment II of U.S. Pat. No. 5,124,298 (Job) from $Mg(OEt)_2$, $Ti(OEt)_4$, and $TiCl_4$. The precipitated Mg/Ti precursor is chlorinated in two stages with $SiCl_4$/$TiCl_4$ and with $BCl_3$/$EtAlCl_2$ as described in U.S. Pat. No.

6,248,831 (Maheshwari, et al.). A dense, microparticulate material of low porosity is obtained, and used in comparative studies.

Examples 12-19 and 20 Comp-22 Comp

Slurry Polymerization Studies

The results of slurry polymerization studies are shown in Table 3.

TABLE 3

Effect of Precursor and Chlorination Process on Catalyst Polymerization Properties (Slurry)

| | Catalyst Preparation | | | Polymer and Catalyst Properties | | |
|---|---|---|---|---|---|---|
| Example | Precursor | First Chlorination | Second Chlorination | Melt Index | HLMI/MI | Activity |
| 12 | Mg/Ti co-spray | SiCl$_4$ | EADC | 0.44 | 58 | 3,000 |
| 13 | Mg/Ti co-spray | SiCl$_4$/TiCl$_4$ | EADC | 0.6 | 49 | 11,500 |
| 14 | Mg/Ti co-spray | SiCl$_4$/TiCl$_4$ | None | — | — | None |
| 15 | Mg/Ti co-spray | None | EADC (2Cl/metal valence) | 2.7 | 44 | 15,000 |
| 16 | Mg/Ti co-spray | SiCl$_4$/EADC | None | 1 | 51 | 25,000 |
| 17 | Mg/Ti/Hf co-spray | None | EASC | 1 | 42 | 13,700 |
| 18 | Mg(OEt)$_2$/B(OEt)$_3$ | SiCl$_4$ | EADC | 1.2 | 48 | 11,500 |
| 19 | Mg(OEt)$_2$/CO$_2$ | SiCl$_4$/TiCl$_4$ | EADC | 2.2 | 42 | 19,500 |
| 20-Comp | MgCl$_2$/TiCl$_3$/THF | None | None | 1.65 | 27 | 16,300 |
| 21-Comp | Mg(OEt)$_2$/CO$_2$ | TiCl$_4$/chlorobenzene 13° C. | TiCl$_4$/chlorobenzene 130° C. | 0.7 | 30 | 21,000 |
| 22-Comp | Mg/Ti Co-Spray | None | EADC (1Cl/metal valence) | 2.1 | 28.1 | 5,350 |

Abbreviations: EASC = Ethyl Aluminum Sesquichloride; EADC = Ethyl Aluminum Dichloride These studies demonstrate, among other things, the effect of catalyst preparation variables on the catalyst properties and the resulting polymer. Polymerizations are conducted at 85° C. in a 1 L slurry reactor for 30 min, with a 30-75 TNHAL (tri-n-hexyl aluminum)/Ti co-catalyst molar ratio, with both the hydrogen/ethylene (H$_2$/C$_2$) ratio and the hexene/ethylene (C$_6$/C$_2$) ratio being adjusted to give resins of the desired melt index and resin density (about 0.95 g/cm$^3$). In the examples of Table 3, the H$_2$/C$_2$ ratio is 0.25 H$_2$/C$_2$ maintained at 100-150 psi pressure.

Examples 12-19 demonstrate that the catalysts of this disclosure produce resins with a broader molecular weight distribution than is feasible with standard Ziegler/Natta (Z/N) catalysts, the results of which are shown in Comparative Examples 20 and 21. While not intending to be bound by theory, the requirements for both high activity and a broadened molecular weight distribution appear to be met by the use of reagents known to transform Mg and Ti alkoxides into metal chlorides (or halides, generally), and incorporation of some of the chlorinating agent into the particle structure, resulting in mixed oxides or alkoxides along with metal halides. Again, while not bound by theory, this hypothesis is consistent with the analysis of chlorinated catalysts that give resins with broadened molecular weight distributions.

Moreover, different methods of chlorination allow control of the amount or extent of high molecular weight tail in the molecular weight distribution. For example, using too vigorous a chlorination reaction as illustrated in Example 21-Comp leads to highly active Z/N catalysts with the relatively narrow molecular weight distribution, typical of traditional Z/N resins. Insufficient chlorination leads to standard Z/N catalysts of lower activity and narrow molecular weight distributions, as illustrated in Example 22-Comp. In contrast, the measured HLMI/MI ratios (melt flow ratios) of from about 40 to about 60 in the inventive examples correspond to a M$_w$/M$_n$ of about 6-8, as compared to the HLMI/MI ratios of about 27-30 of the comparative (control) examples, which correspond to a M$_w$/M$_n$ of about 3.5-4.5.

FIG. 2 provides a plot of the molecular weight distribution (MWD) of gas phase resins polymerized at 85° C., using catalysts according to this disclosure, with curve C illustrating the MWD of polymer from Example 13 using co-sprayed Mg/Ti. The MWDs of polymers from Comparative Examples 20 and 27 are shown in curves A and B, respectively. Among other things, FIG. 2 demonstrates that a broadened molecular weight distribution is achieved by the formation of a resin component with varying amounts of a high molecular weight tail, and is relatively free of a low molecular weight tail.

Examples 23-26 and 27-Comp and 28-Comp

Gas Phase Polymerization Studies

The results of gas phase polymerization studies are shown in Table 4 and FIG. 2.

Gas phase polymerizations are conducted in a continuous fluid bed, with monomer, co-monomer, and hydrogen concentrations likewise being adjusted to produce resins of the desired molecular weight and density. An 8-inch gas phase fluid bed reactor of reaction volume 50 L which is capable of polymerizing olefins at a rate of 5-7 lb/hr at 300 psi pressure is used. The Al/Ti ratio is about 30:1, the H$_2$/C$_2$ (hydrogen:ethylene) ratio is about 0.3-0.5, and the C6/C2 ratio is about 0.01, to provide the results illustrated in Table 4.

Gas phase Examples 23-26 of Table 4 illustrate that the catalysts of this disclosure are highly active and afford resins of the desired molecular weight, density, and the desired broadened molecular weight distribution under industrially-employed gas phase polymerization conditions. Resin particle form follows the form of the catalyst particle. The resins of the current invention are similar to the resins obtained with the precipitated catalyst disclosed in U.S. Pat. No. 6,248,831 (Maheshwari, et al.) (Example 27-Comp), except that higher bulk density is obtained due to the more advantageous physical form of the spray-dried catalyst particles, as compared to the precipitated catalyst particles. Example 28-Comp demonstrates that excessively vigorous chlorination of a precursor leads to a resin with normal, relatively narrow molecular weight distribution in gas phase polymerizations.

TABLE 4

| | | Gas Phase Polymerizations Results | | | | | |
|---|---|---|---|---|---|---|---|
| Example | Precursor | Co-catalyst & Molar Ratio | Polymerization Temp, ° C. | Melt Index | HLMI/MI | Ti residue, ppm | Resin Bulk Density, lb/ft |
| 22 | Ex 13 | 30:1 TNHAL/Ti | 85 | 0.11 | 110 | 1.6 | 19.4 |
| 24 | Ex 13 | 30:1 TNHAL/Ti | 85 | 0.52 | 66 | 1.4 | 17.5 |
| 25 | Ex 19 | 30:1 TNHAL/Ti | 105 | 1.6 | 47 | 1.5 | 21 |
| 26 | Ex 19 | 30:1 TNHAL/Ti | 105 | 1.25 | 45 | 1.8 | 19.7 |
| 27-Comp | Ex 21-Comp | 30:1 TEAL/Ti | 85 | 1.3 | 30 | 2.2 | 19.3 |
| 28-Comp | Ex 11-Comp | 30:1 TNHAL/Ti | 85 | 0.78 | 48 | 1.65 | 15.7 |

Abbreviations: TNHAL, tri-n-hexyl aluminum; TEAL, triethyl aluminum; MI, melt index (ASTM D-1238, Condition E, 190° C., 2.16 kg); HLMI, high load melt index (ASTM D-1238, Condition F, 190° C., 21.6 kg); HLMI/MI, Melt Flow Ratio (MFR)

FIG. 2 presents the molecular weight distribution of gas phase resins polymerized at 85° C. The figure demonstrates that the broadened molecular weight distribution is achieved by the formation of a resin component with varying amounts of a high molecular weight tail, and is relatively free of a low molecular weight tail.

Examples 29 and 30-Comp, 31 and 32-Comp, and 33 and 34-Comp

Comparative Spray-Drying Experiments

Mg/Ti catalyst slurries of nominally 5:1, 12:1, and 20:1 Mg/Ti ratios are prepared in ethanol, where the amount of the Ti component is kept constant and the amount of Mg reagent is increased to give the desired Mg/Ti ratio. Cab-O-Sil® TS-610 is used as inert filler. The amount of Cab-O-Sil® for each comparative series is adjusted to keep the Ti loading constant over the entire series of experiments.

The "inventive" series of Examples 29, 31, and 33 used magnesium ethyl carbonate (solid) and titanium diisopropoxide bis (acetylacetonate) (liquid, Aldrich 325252). The magnesium reagent is prepared in ethanol solution by exhaustive treatment of magnesium ethoxide (solid, Aldrich 291846) with gaseous $CO_2$ until all material is in solution, and CO2 uptake had ceased.

The "comparative" series of Examples Comp-30, Comp-32, and Comp-24 used magnesium chloride (solid, anhydrous, Aldrich 208337) and titanium trichloride ($TiCl_3$ AA, solid, Aldrich 456411).

Spray-drying is conducted in a Büchi 190 spray-drier in a dry box under nitrogen. The magnesium and titanium components are dissolved in ethanol, and slurried with the required amount of TS-610® Cab-O-Sil. Spray-drying is conducted at 105° C. nozzle temperature. The powdery material obtained in the receiver flask is weighed and analyzed.

TABLE 5

| Spray-Drying Experiments with Mg/Ti slurries over a 5:1 to 20:1 Mg/Ti Molar Ratio | | | | | | |
|---|---|---|---|---|---|---|
| | Feed Solution | | | | | |
| Example No. | 29 | 30-Comp | 31 | 32-Comp | 33 | 34-Comp |
| mmol Mg | 38 [A] | 38 [B] | 91 [A] | 91 [B] | 152 [A] | 152 [B] |
| mmol Ti [C] | 7.6 | 7.6 | 7.6 | 7.6 | 7.6 | 7.6 |
| Filler, g | 10.9 | 10.9 | 5.8 | 5.8 | 0 | 0 |
| Feed Mg/Ti [C] | 5:1 | 5:1 | 12:1 | 12:1 | 20:1 | 20:1 |
| Product Analysis | | | | | | |
| material recovered (g) | 14.7 | 13.8 | 19.6 | 8 | 20.9 | 2.7 |
| Mg, mmol/g | 2.2 | 1.8 | 3.8 | 3.2 | 4.9 | 3.9 |
| Ti, mmol/g | 0.41 | 0.39 | 0.33 | 0.32 | 0.28 | 0.27 |
| Mg/Ti | 5.3 | 4.6 | 11.3 | 10 | 17.4 | 14.5 |
| Weight fraction of Mg component recovered | 84% | 65% | 81% | 27% | 68% | 7% |

[A] magnesium ethyl carbonate
[B] magnesium chloride
[C] molar ratio

Table 5 demonstrates that as the magnesium concentration in the slurry is increased, the comparative Mg/Ti samples employing $MgCl_2$/EtOH as starting materials give lower and lower yield of spray-dried product. The materials are instead increasingly more held up on the walls and surfaces of the spray-drier due to formation of a sticky oil. The spray-drier had to be flushed with ethanol to wash the oil out of the system. The inventive Mg/Ti samples employing magnesium ethyl carbonate as the starting material do not become sticky at higher Mg loading, and spray-dry normally, without plating out on the interior surfaces.

Particle Morphology. Examples 33 and 34-Comp are conducted in the absence of a filler that would be expected to provide internal structure for the particles and allow for better solvent evaporation. Microscopy of the spray-dried solid particles obtained from the Examples 33 and 34-Comp catalyst precursors showed differences in morphology of the solid particles. The larger liquid droplets that are sprayed in Example 34-Comp formed large, rigid crystalline hollow shells that persisted throughout the drying step so as to give large, hollow particles that can decompose into broken egg-shell structures.

In contrast, the larger liquid droplets that are sprayed in inventive Example 33 initially formed large, soft, non-crystalline shells which shrink as the interior solvent is evaporated during particle drying. The resulting particles are in the form of full, solid particles that do not have these large interior voids.

Example 35

Preparation of Spray-Dried Particulate Catalyst Precursor and Production of a Polyethylene with a High Molecular Weight Tail Using the Same As disclosed in U.S. Pat. No. 6,187,866 (Jorgensen, et al.), this Example encompasses the in situ blending of polymers where a lower density ethylene copolymer is prepared in a low melt index reactor and a higher density ethylene copolymer is prepared in a high melt index reactor. The process typically comprises continuously contacting, under polymerization conditions, a mixture of ethylene and one or more α-olefins with a catalyst system in two gas phase, fluidized bed reactors connected in series. Typically, a mixture of ethylene copolymer matrix and active catalyst formed in the first reactor in the series is transferred to the second reactor in the series. Other than the active catalyst transferred from the first reactor to the second reactor, no additional transition metal catalyst is introduced into the second reactor; rather, additional hydrocarbyl aluminum cocatalyst is introduced into the second reactor in an amount sufficient to restore the level of activity of the catalyst transferred from the first reactor to about the initial level of activity in the first reactor. These and other aspects of this Example are disclosed in U.S. Pat. No. 6,187,866 (Jorgensen, et al.), the entirety of which is incorporated herein by reference.

In this Example, a spray-dried particulate catalyst precursor is prepared according to Example 10, with the following modifications in the preparation procedure.

Chlorination Reaction. The chlorination of the catalyst precursor is carried out using EASC in hexane at a chlorination temperature of 50° C. with stirring. The resulting slurry is held at this temperature for 1 hour, after which agitation is ceased and the resulting solids are allowed to settle. The supernatant liquid is then decanted off, isopentane solvent is added to the reaction vessel to wash the solids, and agitation is restarted and continued for 15 minutes as the temperature is adjusted to 25° C. After this time, agitation is ceased and the supernatant is decanted again. This procedure using isopentane is repeated. Finally, Crompton HB-380 mineral oil is added to the solids and a mineral oil slurry is formed, which is used in the polymerization reaction.

Continuity Additive Mixture. A continuity additive mixture (CAM) is prepared by mixing, in Crompton HB-380 mineral oil, aluminum distearate (10 wt %) and AS990 (a commercially available ethoxylated stearyl amine—also at 10 wt %). This CAM is injected directly into the reactor.

Polymerization. A gas phase polymerization is carried out using a staged reactor system that is the same as that described in U.S. Pat. No. 6,187,866 (Jorgensen, et al.), Examples 3 through 8, with the following modifications. First, the CAM mixture is injected directly into the first reactor approximately 1 foot above the distribution plate. Catalyst is injected using an isopentane carrier at a location approximately 2 feet above the distribution plate. Polymerization conditions and resin properties are provided in Table 6.

TABLE 6

Polymerization conditions and resin properties as provided in Example 35.

| Parameter | 1st Reactor | 2nd Reactor |
|---|---|---|
| $T_r$ (Reactor Temp), ° C. | 85.01 | 110.00 |
| Residence Time, hr | 3.21 | 1.7 |
| Bed Wt, lbs | 129.43 | 138.07 |
| H2/C2 molar ratio | 0.0999 | 1.80 |
| C6/C2 molar ratio | 0.0119 | 0.00 |
| C2 partial pressure, PSI | 70.35 | 70.17 |
| Cocatalyst | 1 wt % TEAL (AlEt$_3$) | 1 wt % TEAL (AlEt$_3$) |
| Cocatalyst Feed, cc/hr | 135 | 199.05 |
| Inlet Dew Point, ° C. | 63.40 | Not Determined |
| Static, Volts, 90 min avg | −138.01 | 933.23 |
| Static, Volts, 30 min avg | −170.07 | 1021.55 |
| Residual Ti, ppm | 2.59 | 1.52 |
| Residual Al, ppm | 18.67 | 12.1 |
| Al/Ti molar ratio | 12.78 | 14.08 |
| CAM feed, cc/hr | 1.20 | none |
| Isopentane, wt % | 18 | ND |
| $I_2$, dg/min | ND | 0.66 [A] |
| $I_{21}$, dg/min | 3.76 | 53.18 [A] |
| $I_{21}/I_2$ | ND | 81.17 |
| $I_5$, dg/min[B] | ND | 2.63 [A] |
| $I_{21}/I_5$[B] | ND | 20.23 |
| Production Rate, pounds per hour (pph) | 40.32 | 46.89 |
| Density, g/cc | 0.9381 | 0.9574 |
| Bulk Density, lb/ft$^3$ | 30.00 | 33.4 |
| APS (average particle size), inch | 0.014 | 0.0155 |
| Fines wt % <70 micron | 1.98 | 1.74 |
| Mass Balance Hourly rate[C], lbs. | Not measurable when linked | 81.47 |

[A] Melt Flow properties of the second reactor resins were obtained by first compounding the granular resin in an extruder and then measuring melt flow properties on the resulting extrudate.
[B] $I_5$ was measured analogous to $I_2$ according to ASTM D-1238 at 190° C., except $I_5$ is measured using a 5.0 kg load, rather than the 2.16 kg load used to measure $I_2$.
[C] Mass Balance Hourly rate is the mass of product removed from reactor per hour.

Reaction conditions of Table 6 are averages over a 9 hour period of steady state operation. Hydrogen and hexene concentrations are expressed as mole ratios to the ethylene in the reactor. Static is measured using a static probe and is averaged over either a 30 minute or 90 minute period. Production rate in the first reactor is calculated using an energy balance around the reactor. Final production rate is determined by mass, that is, the actual weight of resin removed from the reactor per hour. The Continuity Additive Mixture (CAM) was fed at a rate sufficient to eliminate sheet/chunk formation in the first reactor. Particle size details are provided in Table 7.

TABLE 7

Particle size properties of the ethylene copolymer matrix and active catalyst formed in the first reactor and the second reactor in the series.

| First Reactor | | | Second Reactor | | |
|---|---|---|---|---|---|
| Nominal Particle Size, micron [A] | Wt % | Cumulative Wt % | Nominal Particle Size, micron [A] | Wt % | Cumulative Wt % |
| >2000 | 0.19 | 0.19 | >2000 | 0.34 | 0.34 |
| 1000-2000 | 1.41 | 1.60 | 1000-2000 | 1.77 | 2.11 |
| 500-1000 | 10.17 | 11.76 | 500-1000 | 16.54 | 18.65 |
| 250-500 | 58.49 | 70.25 | 250-500 | 59.17 | 77.82 |
| 125-500 | 27.70 | 97.95 | 125-500 | 20.51 | 98.33 |
| 70-125 | 1.67 | 99.63 | 70-125 | 1.45 | 99.77 |
| pan (<70) | 0.43 | 100.06 | pan (<70) | 0.23 | 100.00 |
| D10 | 113.89 | — | D10 | 122.59 | — |
| D50 | 223.80 | — | D50 | 244.10 | — |
| D90 | 396.58 | — | D90 | 507.70 | — |
| Span | 1.26 | — | Span | 1.58 | — |

[A] Nominal particle size ranges based on sieved samples; therefore 500-1000 micron fraction passed through a 1000 micron sieve and was retained by a 500 micron sieve.

Figure 3:
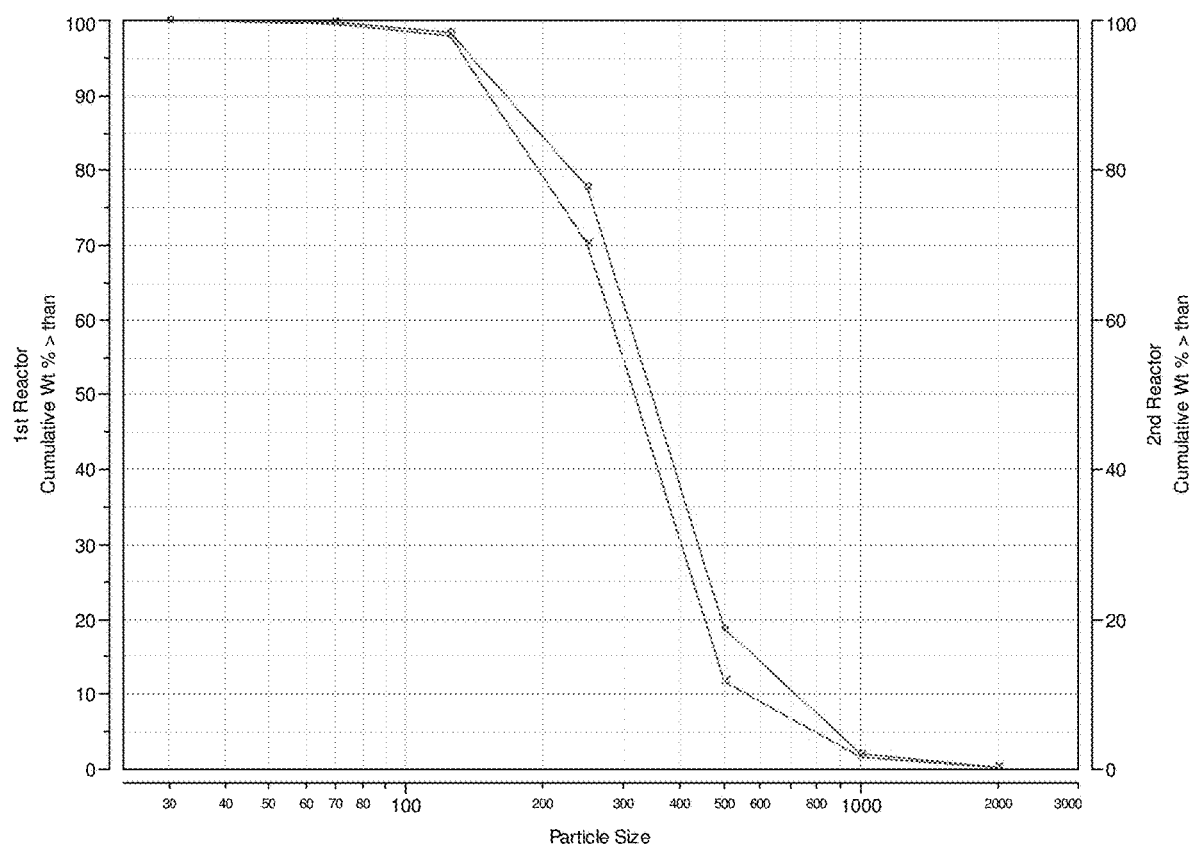
FIG. 3 is a plot of the cumulative weight percent of particles obtained in the first and the second polymerization reactors of Example 35, versus the log of the particle size (micron), demonstrating the robust nature of the catalyst particles and their ability to maintain their structural integrity during a dual reactor polymerization process of Example 35.

The data from Table 7 reveal the particle growth from first reactor to second reactor and the absolute decrease in fine particles from the first to the second reactors. This feature demonstrates the robust nature of the catalyst precursors of the invention, which is further demonstrated graphically in FIG. 3. Thus, FIG. 3 is a plot of the cumulative weight percent of particles obtained in the first and the second polymerization reactors, versus the log of the particle size (micron), demonstrating the robust nature of the catalyst particles and their ability to maintain their structural integrity during a dual reactor polymerization process of this example.

We claim:

1. A method of making a polyethylene polymer containing from about 1% to about 10% of a high molecular weight tail above molecular weight 1,000,000, the method comprising polymerizing ethylene, and optionally, a $C_3$ to $C_8$ α-olefin, with a catalyst system comprising a catalyst component, a halogenating agent; and an activating co-catalyst, wherein the catalyst component is made by a method comprising:
   a) contacting in a slurrying agent:
      i) at least one magnesium dihydrocarbyl oxide;
      ii) at least one Lewis acidic solubilizing agent; and
      iii) at least one titanium compound; and
   b) spray drying the slurry of step a) to evaporate the slurrying agent and to produce solid particles;
   where the magnesium dihydrocarbyl oxide and the titanium compound are present in the slurry in a molar ratio of magnesium to the total moles of the titanium compound and any transition metal compound(s) different than the titanium compound is from about 2 to about 60; and
   wherein the method of making the catalyst component further comprising step c), as follows:
   c) contacting the solid particles of step b) with:
      i) one mild first halogenating agent selected from $SiCl_4$ and $SiCl_4/TiCl_4$ and ii) one strong second halogenating agent of $R^8AlCl_2$, where $R^8$ ethyl, in succession.

2. The method according to claim 1, where step a) of contacting in a slurrying agent components i), ii), and iii) further comprises contacting with:
   iv) at least one transition metal compound different from the titanium compound, where the transition metal is selected from the Groups 4-6 metals.

3. The method according to claim 2, where the transition metal compound different from the titanium compound is selected from:
   a) $Zr(OR^4)_bCl_{4-b}$, $Hf(OR^4)_bCl_{4-b}$, $VOCl_3$, or any combination thereof, where b is an integer from 0 to 4, and $R^4$ in each occurrence is an alkyl group having from 1 to 12 carbon atoms;
   b) $Ti(OR^5)_cX^1_{4-c}$, or any combination of compounds of this formula, where $X^1$ is Cl, Br, or I; c is an integer from 0 to 3; and $R^5$ in each occurrence is an alkyl group having from 1 to 12 carbon atoms;
   c) $TiX^2_d$ where $X^2$ is Cl, Br, or I and d is a number from greater than 0 to less than 4; or
   d) any combination thereof.

4. The method according to claim 1, where step a) of contacting in a slurrying agent components i), ii), and iii) further comprises contacting with:
   v) a non-porous filler.

5. The method according to claim 1, where the slurrying agent is selected from an alcohol having up to 4 carbon atoms or any combination of alcohols having up to 4 carbon atoms.

6. The method according to claim 1, where the Lewis acid solubilizing agent is carbon dioxide and the slurrying agent is an alcohol having from 1 to 4 carbon atoms.

7. The method according to claim 1, where:
   the magnesium dihydrocarbyl oxide has the formula $Mg(OR^1)_2$ where $R^1$ in each occurrence, is selected independently from an alkyl having up to 6 carbon atoms inclusive; and
   the Lewis acidic solubilizing agent is selected from carbon dioxide, sulfur dioxide, formaldehyde, $Al(OR^2)_3$, $B(OR^2)_3$, or any combination thereof, where $R^2$ in each occurrence is selected independently from an alkyl having up to 6 carbon atoms inclusive.

8. The method according to claim 1 wherein activating co-catalyst is selected from at least one compounds of the formula $AlR^{10}_3$, where $R^{10}$ in each occurrence is independently a saturated hydrocarbon groups having from 1 to 14 carbon atoms, optionally substituted with one or more substituents which are inert under the polymerization reaction conditions employed.

9. The method according to claim 1, wherein the polyethylene polymer is a polyethylene homopolymer or an ethylene/$C_3$ to $C_8$ α-olefin copolymer.

* * * * *